US011805318B2

(12) United States Patent
Ohishi

(10) Patent No.: US 11,805,318 B2
(45) Date of Patent: *Oct. 31, 2023

(54) CAMERA BODY, CAMERA ACCESSORY, AND SHARING RATIO TRANSMISSION METHOD

(71) Applicant: NIKON CORPORATION, Tokyo (JP)

(72) Inventor: Sueyuki Ohishi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,233

(22) Filed: Nov. 21, 2022

(65) Prior Publication Data

US 2023/0087007 A1 Mar. 23, 2023

Related U.S. Application Data

(63) Continuation of application No. 17/261,934, filed as application No. PCT/JP2019/027749 on Jul. 12, 2019, now Pat. No. 11,553,133.

(30) Foreign Application Priority Data

Jul. 20, 2018 (JP) .................................. 2018-136450

(51) Int. Cl.
*H04N 23/68* (2023.01)
*G03B 17/14* (2021.01)
*G03B 5/04* (2021.01)

(52) U.S. Cl.
CPC .............. *H04N 23/687* (2023.01); *G03B 5/04* (2013.01); *G03B 17/14* (2013.01); *H04N 23/6812* (2023.01); *G03B 2206/00* (2013.01)

(58) Field of Classification Search
CPC ........... H04N 5/23209; H04N 5/23227; H04N 5/2328; H04N 5/23283; H04N 5/23287;
(Continued)

(56) References Cited

U.S. PATENT DOCUMENTS

2013/0028590 A1* 1/2013 Hasuda ................ G03B 17/566
396/530
2015/0264266 A1 9/2015 Katsuyama et al.
(Continued)

FOREIGN PATENT DOCUMENTS

CN 105704364 A 6/2016
JP H11-038461 A 2/1999
(Continued)

OTHER PUBLICATIONS

Sep. 24, 2019 Search Report issued International Patent Application No. PCT/JP2019/027749.
(Continued)

*Primary Examiner* — Paul M Berardesca
(74) *Attorney, Agent, or Firm* — Oliff PLC

(57) ABSTRACT

A camera body with which it is possible to improve the effect of shake correction, a camera accessory, and an information transmission method wherein the camera body to which a camera accessory can be detachably mounted, and includes: a movable section which is movable to correct shaking of the camera body; a detection unit which detects the shake and outputs a detection signal; a calculation unit which, on the basis of the detection signal, calculates an amount of movement of the movable section; and a transmission unit which transmits, to the camera accessory, body-side information the calculation unit uses to calculate the amount of movement.

14 Claims, 11 Drawing Sheets

(58) Field of Classification Search
CPC .. H04N 23/663; H04N 23/665; H04N 23/685; H04N 23/696; H04N 23/687; G03B 17/14; G03B 2205/0007–0038; G02B 27/64; G02B 27/646
See application file for complete search history.

(56) References Cited

U.S. PATENT DOCUMENTS

| | | |
|---|---|---|
| 2016/0173781 A1 | 6/2016 | Tsuchiya |
| 2016/0330378 A1 | 11/2016 | Tsuchiya |
| 2017/0019600 A1 | 1/2017 | Koyano |
| 2017/0309002 A1 | 10/2017 | Koyano |
| 2019/0215454 A1 | 7/2019 | Kimura |
| 2019/0230288 A1 | 7/2019 | Tsuchiya |
| 2019/0289216 A1 | 9/2019 | Ito |
| 2020/0026151 A1* | 1/2020 | Kawai .................... H04N 23/67 |
| 2020/0068114 A1* | 2/2020 | Kawai .................... H04N 23/66 |
| 2020/0084358 A1 | 3/2020 | Nadamoto |
| 2020/0162674 A1 | 5/2020 | Ito |
| 2020/0177816 A1 | 6/2020 | Takeuchi |
| 2020/0260010 A1 | 8/2020 | Nakajima et al. |
| 2021/0092296 A1 | 3/2021 | Kuribayashi |

FOREIGN PATENT DOCUMENTS

| | | |
|---|---|---|
| JP | 2007-025298 A | 2/2007 |
| JP | 2008-040085 A | 2/2008 |
| JP | 2010-091792 A | 4/2010 |
| JP | 2010-237514 A | 10/2010 |
| JP | 2015-045885 A | 3/2015 |
| JP | 2016-114792 A | 6/2016 |
| JP | 2018-112761 A | 7/2018 |
| JP | 6508402 B1 * | 5/2019 ........... G02B 27/646 |

OTHER PUBLICATIONS

Aug. 2, 2021 Office Action issued in Chinese Patent Application No. 201980047537.4.
Jan. 6, 2022 Office Action issued in Japanese Patent Application No. 2020-531297.
Mar. 31, 2022 Office Action issued in U.S. Appl. No. 17/261,934.
May 9, 2022 Office Action issued in Chinese Patent Application No. 201980047537.4.
Jun. 14, 2022 Office Action issued in Japanese Patent Application No. 2020-531297.
Sep. 2, 2022 Notice of Allowance issued in U.S. Appl. No. 17/261,934.
Nov. 3, 2022 Office Action issued in Chinese Application No. 201980047537.4.
Dec. 15, 2022 Corrected Notice of Allowability issued in U.S. Appl. No. 17/261,934.

* cited by examiner

FIG. 5

DATA 92

| DATA | DATA CONTENT |
|---|---|
| 92a | LENS-SIDE ANGULAR BLURRING STATE (X-AXIS) |
| 92b | LENS-SIDE ANGULAR BLURRING STATE (Y-AXIS) |
| 92c | LENS-SIDE ANGULAR BLURRING STATE (X-AXIS) |
| 92d | LENS-SIDE ANGULAR BLURRING STATE (Y-AXIS) |
| 92e | VALID/INVALID INFORMATION (X-AXIS) |
| 92f | VALID/INVALID INFORMATION (Y-AXIS) |
| 92g | MOVEMENT STATE OF BLURRING CORRECTION LENS |
| 92h | POSITION OF BLURRING CORRECTION LENS (X-AXIS) |
| 92i | POSITION OF BLURRING CORRECTION LENS (Y-AXIS) |
| 92q | OPERATION STATE OF OPERATION MEMBER |

FIG. 7

| BODY-SIDE BLURRING STATE | LENS-SIDE BLURRING STATE | TOTAL BLURRING STATE |
|---|---|---|
| STATE OF BEING CHANGED IN COMPOSITION | Don't Care | STATE OF BEING CHANGED IN COMPOSITION |
| STABLE COMPOSITION STATE | Don't Care | STABLE COMPOSITION STATE |
| TRIPOD FIXATION STATE | Don't Care | TRIPOD FIXATION STATE |
| LENS-SIDE PRIORITY STATE | STATE OF BEING CHANGED IN COMPOSITION | STATE OF BEING CHANGED IN COMPOSITION |
| | STABLE COMPOSITION STATE | STABLE COMPOSITION STATE |
| | TRIPOD FIXATION STATE | TRIPOD FIXATION STATE |
| | UNSTABLE | UNSTABLE |

FIG. 8

| TOTAL BLURRING STATE | CUTOFF FREQUENCY $fc\omega$ | FIRST CORRECTION RATE $G\omega 1$ |
|---|---|---|
| STATE OF BEING CHANGED IN COMPOSITION | 8.0Hz | 0.10 |
| STABLE COMPOSITION STATE | 0.1Hz | 1.00 |
| TRIPOD FIXATION STATE | 2.0Hz | 0.90 |
| UNSTABLE | 8.0Hz | 0.00 |

FIG. 9

|  |  | SECOND CORRECTION RATE OF ANGULAR BLURRING Gω2 | | SECOND CORRECTION RATE OF TRANSLATIONAL BLURRING Gα2 | |
|---|---|---|---|---|---|
|  |  | INTERCHANGEABLE LENS | BODY | INTERCHANGEABLE LENS | BODY |
| MOVING IMAGE | | 0.5 | 0.5 | 0.5 | 0.5 |
| STILL IMAGE | HIGH-SPEED SHUTTER SPEED (1/60 OR MORE) | 1.0 | 0.0 | 1.0 | 0.0 |
| | LOW-SPEED SHUTTER SPEED (LESS THAN 1/60) | 0.5 | 0.5 | 0.5 | 0.5 |

FIG. 10

| | BODY-SIDE ANTIVIBRATION MODE | LENS-SIDE ANTIVIBRATION MODE | INTEGRATION UNIT-CUTOFF FREQUENCY fc_inteω |
|---|---|---|---|
| MOVING IMAGE | SPORTS MODE | Don't Care | 0.7Hz |
| | NORMAL MODE | Don't Care | 0.3Hz |
| | LENS-SIDE PRIORITY MODE | SPORTS MODE | 0.7Hz |
| | | NORMAL MODE | 0.3Hz |
| | | NO SETTING SWITCH | 0.3Hz |
| STILL IMAGE | SPORTS MODE | Don't Care | 0.7Hz |
| | NORMAL MODE | Don't Care | 0.0Hz |
| | LENS-SIDE PRIORITY MODE | SPORTS MODE | 0.7Hz |
| | | NORMAL MODE | 0.0Hz |
| | | NO SETTING SWITCH | 0.0Hz |

FIG. 11

| TOTAL BLURRING STATE | CUTOFF FREQUENCY $fc\alpha$ | FIRST CORRECTION RATE $G\alpha 1$ |
|---|---|---|
| STATE OF BEING CHANGED IN COMPOSITION | 8.0Hz | 0.10 |
| STABLE COMPOSITION STATE | 0.1Hz | 1.00 |
| TRIPOD FIXATION STATE | 3.0Hz | 0.75 |
| UNSTABLE | 8.0Hz | 0.00 |

FIG. 12

| | BODY-SIDE ANTIVIBRATION MODE | LENS-SIDE ANTIVIBRATION MODE | TWICE-INTEGRATION UNIT-CUTOFF FREQUENCY $fc\_int e\alpha$ |
|---|---|---|---|
| MOVING IMAGE | SPORTS MODE | Don't Care | 1.4Hz |
| | NORMAL MODE | Don't Care | 0.7Hz |
| | LENS-SIDE PRIORITY MODE | SPORTS MODE | 1.4Hz |
| | | NORMAL MODE | 0.7Hz |
| | | NO SETTING SWITCH | 0.7Hz |
| STILL IMAGE | SPORTS MODE | Don't Care | 1.4Hz |
| | NORMAL MODE | Don't Care | 0.0Hz |
| | LENS-SIDE PRIORITY MODE | SPORTS MODE | 1.4Hz |
| | | NORMAL MODE | 0.0Hz |
| | | NO SETTING SWITCH | 0.0Hz |

CAMERA BODY, CAMERA ACCESSORY, AND SHARING RATIO TRANSMISSION METHOD

CROSS-REFERENCE TO RELATED APPLICATIONS

The present application is a continuation of U.S. patent application Ser. No. 17/261,934 filed on Jan. 21, 2021, which is a national stage entry of PCT/JP2019/027749 filed on Jul. 12, 2019, which claims benefit of priority to JP 2018-136450 filed on Jul. 20, 2018. The contents of these applications are incorporated herein by reference in their entirety.

TECHNICAL FIELD

The present invention relates to a camera body, a camera accessory, and an information transmission method.

BACKGROUND ART

An interchangeable lens including a blurring correction apparatus is known (see Patent Document 1). However, when the interchangeable lens including the blurring correction apparatus is mounted on a camera body including a blurring correction apparatus, the cooperation of blurring correction in the interchangeable lens and blurring correction in the camera body becomes a problem.

Patent Document 1: Japanese Unexamined Patent Application, Publication No. H11-38461

DISCLOSURE OF THE INVENTION

A camera body according to a first aspect of the present invention is a camera body to which a camera accessory is detachably mounted, the camera body including: a movable unit that is movable to correct blurring of the camera body; a detection unit that detects the blurring and outputs a detection signal; a calculation unit that calculates a moving distance of the movable unit based on the detection signal; and a transmission unit that transmits, to the camera accessory, body-side information used by the calculation unit to calculate the moving distance.

A camera accessory according to a second aspect of the present invention is a camera accessory detachably mounted to a camera body, the camera accessory including: a movable unit that is movable to have a component orthogonal to an optical axis of the camera accessory; a detection unit that detects blurring of the camera accessory and outputs a detection signal; a calculation unit that calculates a moving distance of the movable unit based on the detection signal; and a receiving unit that receives body-side information, based on information used by the calculation unit, to calculate the moving distance, from the camera body.

An information transmission method according to a third aspect of the present invention is a method of transmitting information between a camera accessory detachably mounted to a camera body and the camera body, the method including: detecting blurring of the camera body and outputting a detection signal; calculating, based on the detection signal, a moving distance of a movable unit that is movable in a direction intersecting an optical axis; and transmitting body-side information to calculate the moving distance between the camera body and the camera accessory.

BRIEF DESCRIPTION OF THE DRAWINGS

FIG. 5 is a view illustrating information included in second data 92;

FIG. 7 is a view showing an operation of a second judgement unit 336;

FIG. 8 is a view showing a relation between a total blurring state for angular blurring, a cutoff frequency $fc\omega$, and a first correction rate $G\omega 1$;

FIG. 9 is a view showing a relation between still-image/moving-image antivibration, a shutter speed, and a second correction rate;

FIG. 10 is a view showing a relation between still-image/moving-image antivibration, an antivibration mode, and a cutoff frequency $fc\_int e\omega$;

FIG. 11 is a view showing a relation between a total blurring state for translational blurring, a cutoff frequency $fc\alpha$, and a first correction rate $G\alpha 1$;

FIG. 12 is a view showing a relation between still-image/moving-image antivibration, an antivibration mode, and a cutoff frequency $fc\_int e\alpha$;

PREFERRED MODE FOR CARRYING OUT THE INVENTION

An embodiment for carrying out the invention will be described below with reference to the drawings.

Figure 1:
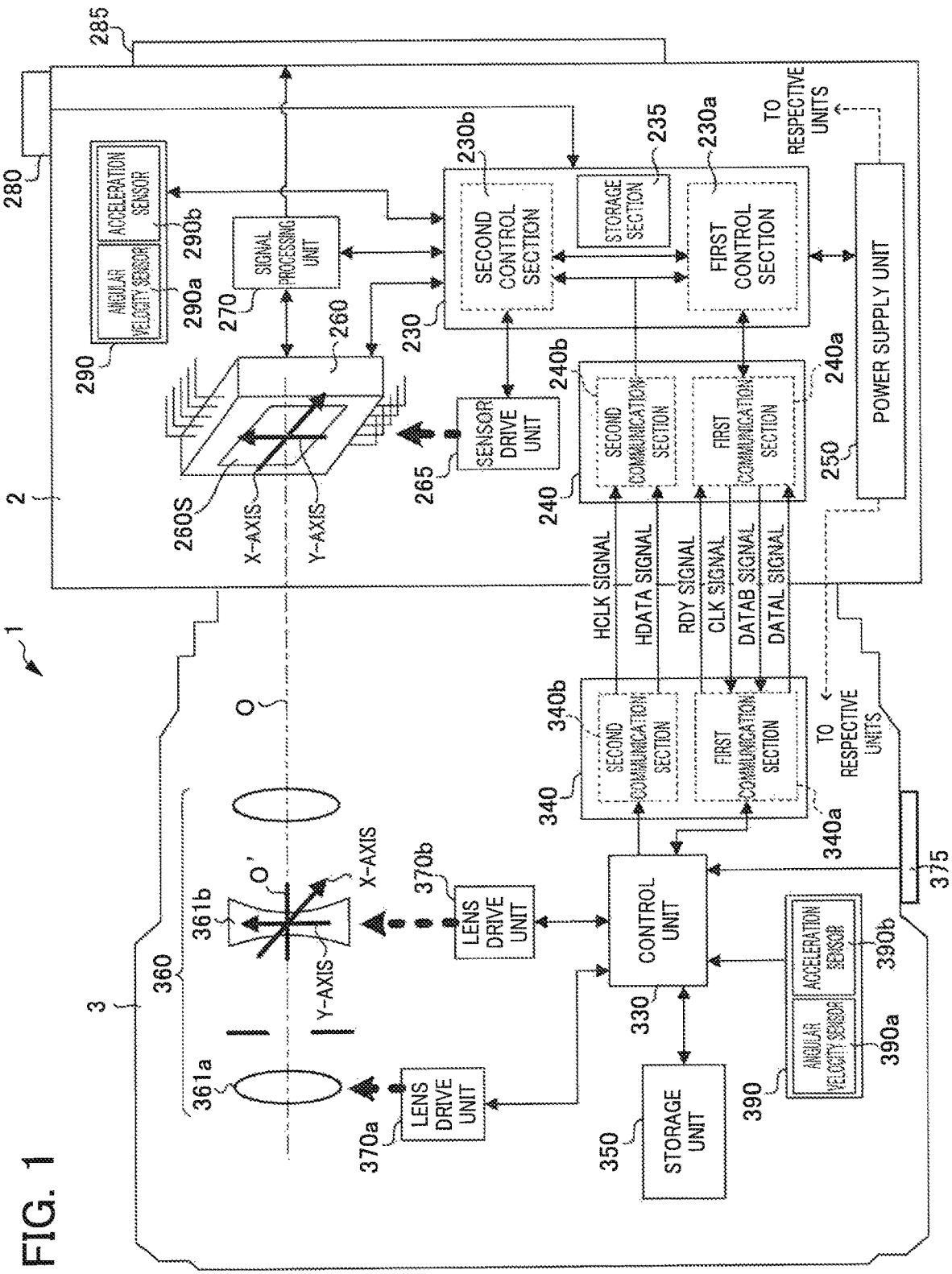
FIG. 1 is a block diagram illustrating main components of a camera system.

FIG. 1 is a block diagram illustrating main components of a camera system 1. The camera system 1 of the present embodiment is configured in which a camera body 2 and an interchangeable lens 3 are detachably mounted. In FIG. 1, an optical axis O of the interchangeable lens 3, and an X-axis direction and a Y-axis direction in a plane intersecting the optical axis O are indicated by lines, respectively.

<Camera Body>

The camera body 2 includes a body-side control unit 230, a body-side communication unit 240, a power supply unit 250, an imaging sensor 260, a sensor drive unit 265, a signal processing unit 270, an operation member 280, a blurring sensor 290, and a display unit 285. The body-side control unit 230 is connected to the body-side communication unit 240, the power supply unit 250, the imaging sensor 260, the sensor drive unit 265, the signal processing unit 270, the operation member 280, and the blurring sensor 290.

The body-side communication unit 240 performs predetermined communication with a lens-side communication unit 340 of the interchangeable lens 3. The body-side communication unit 240 transmits a signal to the body-side control unit 230. The body-side communication unit 240 includes a body-side first communication section 240a and a body-side second communication section 240b. The body-side first communication section 240a performs command data communication to be described below with the interchangeable lens 3, and the body-side second communication section 240b performs hotline communication to be described below with the interchangeable lens 3.

The body-side first communication section 240a is connected to a body-side first control section 230a to be described below, and information transmitted and received between the camera body 2 and the interchangeable lens 3 in command data communication is output or input by the body-side first control section 230a. The body-side second communication section 240b is connected to the body-side first control section 230a and a body-side second control section 230b to be described below, and information transmitted from the interchangeable lens 3 to the camera body 2 in hotline communication is transmitted to the body-side first control section 230a and the body-side second control section 230b.

The power supply unit 250 converts a voltage of a battery (not shown) into voltages used in the respective units of the camera system 1, and supplies the converted voltages to the respective units of the camera body 2 and the interchangeable lens 3. The power supply unit 250 can switch the power supply on and off for each power supply destination according to an instruction of the body-side control unit 230.

The imaging sensor 260 is a solid-state imaging sensor such as a CMOS imaging sensor or a CCD imaging sensor. The imaging sensor 260 captures an object image of an imaging surface 260S according to a control signal from the body-side control unit 230, and then outputs a signal. The imaging sensor 260 can perform moving image photographing and still image photographing. The moving image photographing includes not only recording of moving image but also photographing of a so-called through image for continuously displaying an image formation state on the display unit 285.

The signal output from the imaging sensor 260 is used by the signal processing unit 270 to generate image data for through image and image data for still image photographing. The imaging sensor 260 is connected to the signal processing unit 270 and the body-side control unit 230.

The signal processing unit 270 performs predetermined image processing on the signal output from the imaging sensor 260 to generate image data. The generated image data is recorded in a storage medium (not shown) in a predetermined file format or used for the display unit 285 to display an image. The signal processing unit 270 is connected to the body-side control unit 230, the imaging sensor 260, and the display unit 285.

The blurring sensor 290 detects blurring of the camera body 2 caused by hand. The blurring sensor 290 includes an angular velocity sensor 290a and an acceleration sensor 290b. The blurring sensor 290 detects angular blurring and translational blurring separately for an X-axis direction component and a Y-axis direction component.

The angular velocity sensor 290a detects an angular velocity generated by rotational movement of the camera body 2. The angular velocity sensor 290a individually detects a rotation about an axis parallel to the X axis, and a rotation about an axis parallel to the Y axis, for example, and outputs a detection signal for a blurring angular velocity $\omega 1$ in the X-axis direction and a detection signal for a blurring angular velocity $\omega 2$ in the Y-axis direction to the body-side control unit 230.

Further, the acceleration sensor 290b detects an acceleration generated by translational movement of the camera body 2. The acceleration sensor 290b individually detects an acceleration in an axial direction parallel to the X axis and an acceleration in an axial direction parallel to the Y axis, for example, and outputs a detection signal for a blurring acceleration $\alpha 1$ in the X-axis direction and a detection signal for a blurring acceleration $\alpha 2$ in the Y-axis direction to the body-side control unit 230.

Each of the angular velocity sensor 290a and the acceleration sensor 290b can periodically output a detection signal at a cycle shorter than a cycle of the hotline communication.

The body-side control unit 230 includes a microcomputer and peripheral circuits thereof. The body-side control unit 230 includes a storage section 235. In the storage section 235, recording and reading of data are controlled by the body-side control unit 230. The storage section 235 stores control programs to be executed by the body-side control unit 230. The body-side control unit 230 executes the control programs stored in the storage section 235 to control the respective unit in the camera body 2.

The body-side control unit 230 includes a body-side first control section 230a and a body-side second control section 230b. The body-side first control section 230a mainly controls the entire camera body 2, and the body-side second control section 230b is connected to the sensor drive unit 265 and mainly controls a blurring correction operation of moving the imaging sensor 260 in a direction intersecting the optical axis. Since the body-side second control section 230b mainly controls the blurring correction operation, a control for blurring correction can be quickly performed. The body-side first control section 230a transmits an instruction for blurring correction, such as a start of blurring correction and a correction rate (to be described below) to the body-side second control section 230b. The body-side first control section 230a and the body-side second control section 230b mutually transmit and receive necessary data and instructions, as appropriate.

The sensor drive unit 265 includes, for example, an actuator, a drive mechanism, and a position detection unit. The sensor drive unit 265 moves the imaging sensor 260 in a direction intersecting the optical axis O, based on an instruction output from the body-side control unit 230. The movement of the imaging sensor 260 in a direction intersecting the optical axis O can reduce blurring (image blurring) of the object image on the imaging surface 260S of the imaging sensor 260. The sensor drive unit 265 uses the position detection unit such as a Hall element to detect a position of the imaging sensor 260 in the direction intersecting the optical axis O.

The operation member 280 including a release button and an operation switch is provided on an exterior surface of the camera body 2. A user operates the operation member 280 to issue a photographing instruction and an instruction for setting photographing conditions. The user can instruct the operation member 280 to turn ON or OFF a blurring correction function and to set an antivibration mode to a sports mode, a normal mode, and a lens-side priority mode, thereby setting blurring correction.

The sports mode is a mode suitable for blurring correction to make a movable range smaller and a blurring correction angle smaller than in a normal mode under conditions such as pursuing a fast-moving object, changing the composition frequently, and increasing a shutter speed. The normal mode is a mode in which a movable range can increase by being matched with a mechanical movable range and a blurring correction effect can be enhanced.

The lens-side priority mode is a mode in which when an antivibration mode of the camera body 2 does not match an antivibration mode of the interchangeable lens 3, the antivibration mode of the camera body 2 is matched with the antivibration mode set in the interchangeable lens 3.

In the present embodiment, as will be described below, since at least a part of the blurring correction setting can also be set by the instruction unit 375 of the interchangeable lens 3, the blurring correction setting of the camera body 2 may not match the blurring correction setting of the interchangeable lens 3. When the blurring correction setting of the camera body 2 does not match the blurring correction setting of the interchangeable lens 3, a blurring correction effect of the interchangeable lens 3 and a blurring correction effect of the camera body 2 do not match each other, and a live view image may appear unnatural.

In the present embodiment, the operation performed by the operation member 280 is transmitted to the body-side first control section 230a, and the instruction from the instruction unit 375 is transmitted to the body-side first control section 230a in a manner of command data communication or hotline communication. Therefore, the body-side first control section 230a can recognize the blurring correction settings in the camera body 2 and the interchangeable lens 3, and the body-side first control section 230a can transmit an instruction for blurring correction setting to the interchangeable lens 3 in a manner of command data communication, so that the blurring correction setting of the camera body 2 can be matched with the blurring correction setting of the interchangeable lens 3.

The operation member 280 sends an operation signal corresponding to the user's operation to the body-side control unit 230.

The display unit 285 includes a liquid crystal display panel, for example. The display unit 285 displays an image based on the image data processed by the signal processing unit 270 and an operation menu screen according to an instruction from the body-side control unit 230. Further, photographing conditions may be set by a touch panel operation of the display unit 285, instead of the operation member 280.

<Interchangeable Lens>

The interchangeable lens 3 includes a lens-side control unit (calculation unit) 330, a lens-side communication unit 340, a lens-side storage unit 350, an imaging optical system 360, a lens drive unit 370, an instruction unit 375, and a blurring sensor 390. The lens-side control unit 330 is connected to the lens-side communication unit 340, the lens-side storage unit 350, the lens drive unit 370, the instruction unit 375, and the blurring sensor 390.

The lens-side control unit 330 includes a microcomputer and peripheral circuits thereof. The lens-side control unit 330 executes control programs stored in a lens-side storage unit 350 to control the respective units of the interchangeable lens 3 to perform automatic focus adjustment control, blurring correction control, and the like. Blurring correction control by the lens-side control unit 330 will be described below.

The lens-side storage unit 350 includes a non-volatile storage medium. In the lens-side storage unit 350, recording and reading of data are controlled by the lens-side control unit 330. The lens-side storage unit 350 can store data indicating optical characteristics of the imaging optical system 360, a cutoff frequency (fcω, fcα, fc_inteω, or fc_inteα which will be described below), and a first correction rate (Gω1 or Gα1 which will be described below) according to blurring correction setting, in addition to the control programs to be executed by the lens-side control unit 330.

The imaging optical system 360 includes a plurality of lenses and aperture members, and forms an object image on an image formation surface (imaging surface 260S). At least a part of the imaging optical system 360 is configured as a moving member that is movable in the interchangeable lens 3.

The imaging optical system 360 includes, for example, a focusing lens 361a as a moving member and a blurring correction lens 361b as a moving member.

The lens drive unit 370 is configured to move the moving members, and includes lens drive units 370a and 370b. Each of the lens drive units 370 includes an actuator, a drive mechanism, and a position detection unit for the moving members. The lens-side control unit 330 periodically creates positional information on the moving member based on signals from the position detection unit and the actuator of the lens drive unit 370.

In addition, the lens-side control unit 330 periodically recognizes movement states according to signals from the position detection unit and the actuator of the lens drive unit 370, such as whether a moving member is being driven to move, a movement direction of the moving member, and whether the moving member is stopped. A cycle at which positional information of the moving member is created and a cycle at which movement states of the moving member is recognized can be made shorter than the cycle of the hotline communication.

The focusing lens 361a is configured to be movable back and forth along the optical axis O by the lens drive unit 370a. A focus position of the imaging optical system 360 is adjusted by the movement of the focusing lens 361a. Drive instructions such as a moving direction, a moving distance, and a movement speed of the focusing lens 361a may be issued from the body-side control unit 230, or may be issued by the lens-side control unit 330 in consideration of the instructions from the body-side control unit 230. The position of the focusing lens 361a in the direction of the optical axis O can be detected by an encoder such as the lens drive unit 370a.

The blurring correction lens 361b is configured to be movable back and forth in a direction intersecting the optical axis O by the lens drive unit 370b. The movement of the blurring correction lens 361b can reduce a shake of an object image (image blurring) on the imaging surface 260S of the imaging sensor 260. Drive instructions such as a moving direction, a moving distance, and a movement speed of the blurring correction lens 361b may be issued by the lens-side control unit 330 based on the detection signal of the blurring sensor 390, or may be issued by the lens-side control unit 330 in consideration of the detection signal of the blurring sensor 390 and the instructions from the body-side control unit 230.

The position of the blurring correction lens 361b can be detected by a Hall element of the lens drive unit 370b. As positional information on the blurring correction lens 361b, the lens drive unit 370b detects a position of the optical axis O' of the blurring correction lens 361b in a plane intersecting the optical axis O, for example. In other words, a coordinate value in the X-axis direction and a coordinate value in the Y-axis direction of the optical axis O' of the blurring correction lens 361b are detected, with the optical axis O as an origin position. Therefore, the positional information on the blurring correction lens 361b can be represented by the position of the optical axis O' in the X-axis direction and the position in the Y-axis direction, and can be represented by the moving distance of the optical axis O' in the X-axis direction (difference in coordinate values) and the moving distance in the Y-axis direction.

The instruction unit 375 is provided, for example, on an outer cylinder of the interchangeable lens 3. By the operation of the instruction unit 375, the user can instruct the interchangeable lens 3 to turn ON or OFF a blurring correction function and to set an antivibration mode to a sports mode or a normal mode, thereby setting blurring correction with the interchangeable lens 3. The operation signal corresponding to the user's operation is sent from the instruction unit 375 to the lens-side control unit 330.

The blurring sensor 390 detects blurring of the interchangeable lens 3 due to blurring caused by hand. The blurring sensor 390 is equivalent to the blurring sensor 309 of the camera body 2. The blurring sensor 390 outputs a detection signal of the angular velocity sensor 390a and a detection signal of the acceleration sensor 390b to the lens-side control unit 330. Each of the angular velocity sensor 390a and the acceleration sensor 390b can periodically output the detection signal at a cycle shorter than the cycle of the hotline communication.

The lens-side communication unit 340 performs predetermined communication with the body-side communication unit 240. The lens-side communication unit 340 includes a lens-side first communication section 340a and a lens-side second communication section 340b. The lens-side first communication section 340a performs command data communication (to be described below) with the camera body 2, and the lens-side second communication section 340b performs hotline communication (to be described below) with the camera body 2.

The lens-side first communication section 340a is connected to the lens-side control unit 330, and information transmitted from the interchangeable lens 3 to the camera body 2 in a manner of command data communication is created by the lens-side control unit 330. The lens-side second communication section 340b is also connected to the lens-side control unit 330, and information transmitted from the interchangeable lens 3 to the camera body 2 in a manner of hotline communication is created by the lens-side control unit 330 and the lens-side second communication section 340b.

Arrows between the lens-side communication unit 340 and the body-side communication unit 240 in FIG. 1 indicate a flow of signals.

The lens-side first communication section 340a outputs a signal (hereinafter, referred to as a RDY signal) and a data signal (hereinafter, referred to as a DATAL signal) indicating whether the interchangeable lens 3 is ready for command data communication, toward the body-side first communication section 240a. The body-side first communication section 240a outputs a clock signal (hereinafter, referred to as a CLK signal) and a data signal (hereinafter, referred to as a DATAB signal) for command data communication, toward the lens-side first communication section 340a.

The lens-side second communication section 340b outputs a clock signal (hereinafter, referred to as a HCLK signal) and a data signal (hereinafter, referred to as a HDATA signal) for hotline communication, toward the body-side second communication section 240b.

The hotline communication is one-way data communication from the interchangeable lens 3 to the camera body 2, and the command data communication is two-way data communication between the interchangeable lens 3 and the camera body 2.

<Details of Communication>

The camera system 1 includes two independent communication systems for command data communication and hotline communication, and thus the respective types of communication can be performed in parallel.

In other words, the camera body 2 and the interchangeable lens 3 can start or finish the hotline communication while performing the command data communication. In addition, it is possible to perform the command data communication while performing the hotline communication.

Therefore, the interchangeable lens 3 can continuously transmit data to the camera body 2 in the hotline communication even during the command data communication. For example, even when a time required for the command data communication increases due to an increase in the amount of data, the hotline communication can be performed at a required timing.

Furthermore, while receiving data in the hotline communication, the camera body 2 can also transmit various instructions and requests to the interchangeable lens 3 at an arbitrary timing in the command data communication and can receive data from the interchangeable lens 3 at an arbitrary timing.

Figure 2:
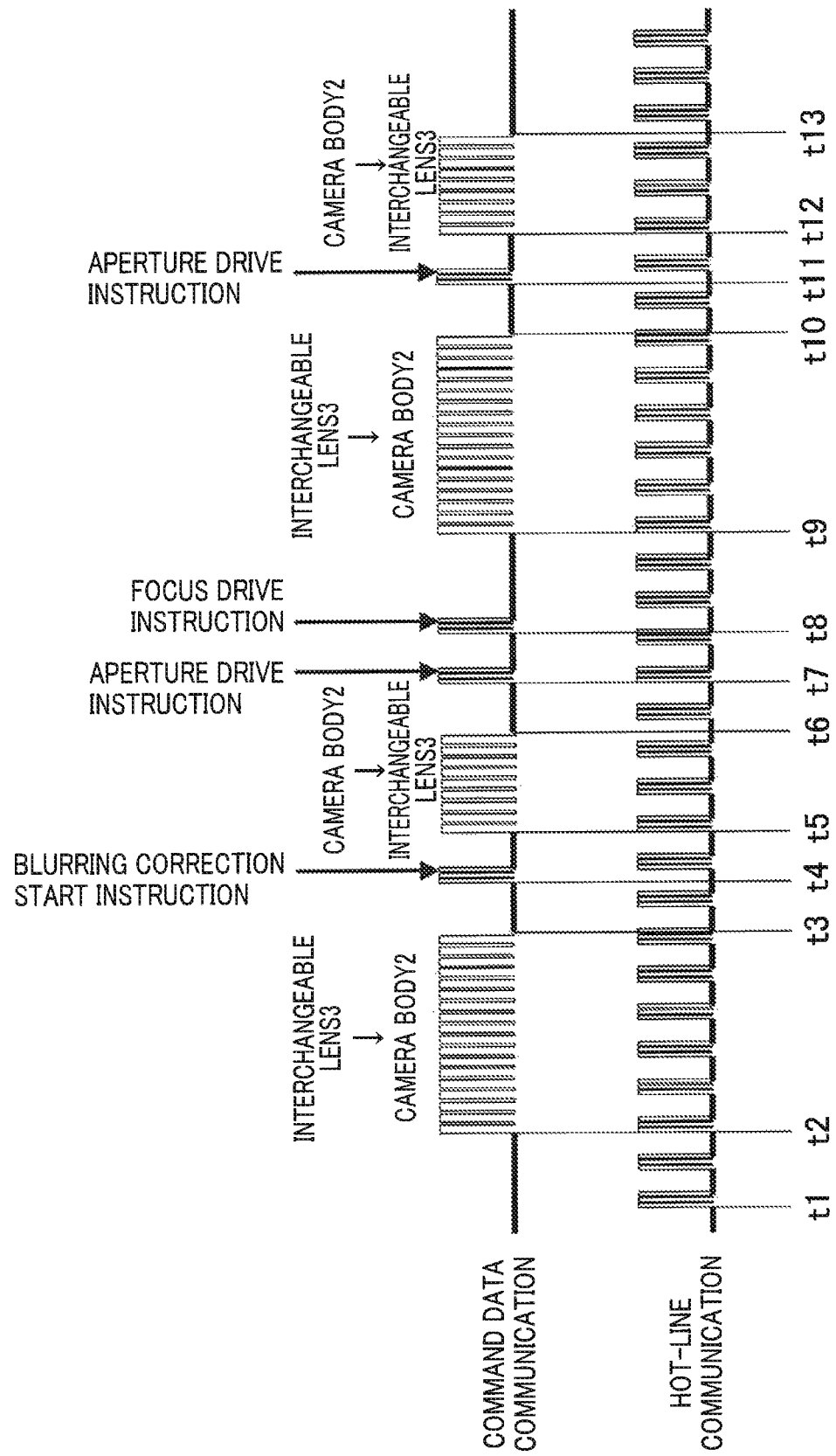
FIG. 2 is a timing chart illustrating command data communication and hotline communication.

FIG. 2 is a timing chart illustrating the command data communication and the hotline communication.

After instructing the start of the hotline communication in the command data communication, the camera body 2 periodically receives data from the interchangeable lens 3 in the hotline communication after time t1, for example.

Further, the camera body 2 transmits and receives to/from the interchangeable lens 3 in the command data communication. Specifically, the camera body 2 instructs the interchangeable lens 3 to transmit and receives various types of data, from time t2 to time t3 and from time t9 and time t10. Then, from time t5 to time t6 and from time t12 to time t13, the camera body 2 transmits various types of data to the interchangeable lens 3. At times t4, t7, t8, and t11 in between, the camera body 2 transmits instructions relating to movement control of the moving members, such as a blurring correction start instruction, an aperture drive instruction, and a focus drive instruction, to the interchangeable lens 3.

In the present embodiment, a large number of types of data are transmitted and received and a frequency of instructions to the interchangeable lens 3 is high in the command data communication. Further, depending on types of data, a time required for transmission and reception may become long. Thus, times of transmitting and receiving various types of data from time t2 to time t3, from time t5 to time t6, from time t9 to time t10, and from time t12 to time t13 may be longer than times of transmitting instructions at times t4, t7, t8, and tn.

In response to an instruction from the camera body 2 sent in the command data communication, for example, the interchangeable lens 3 transmits data indicating information on the interchangeable lens 3 (such as a focal length, a photographing distance, an aperture value, or optical characteristics of the imaging optical system 360), to the camera body 2. The interchangeable lens 3 further receives data indicating information on the camera body 2 (such as a frame rate or a setting of the camera body 2), which is transmitted from the camera body 2.

In the command data communication, a time required for one transmission and reception is long and a frequency of transmission and reception is high. It is therefore difficult to continuously perform data communication at a short cycle.

On the other hand, in the hotline communication, data communication from the interchangeable lens 3 to the camera body 2 can be continuously performed at a short cycle because a communication terminal used for the hotline communication is different from the communication terminal used for the command data communication. For example, the hotline communication can be performed in a desired time period from completion of an activation process of the camera body 2 to a blocking process, including an exposure period.

A start instruction and an end instruction for the hotline communication are transmitted from the camera body 2 to the interchangeable lens 3 in the command data communication, but the invention is not limited thereto.

<Description of Command Data Communication>

Figure 3:
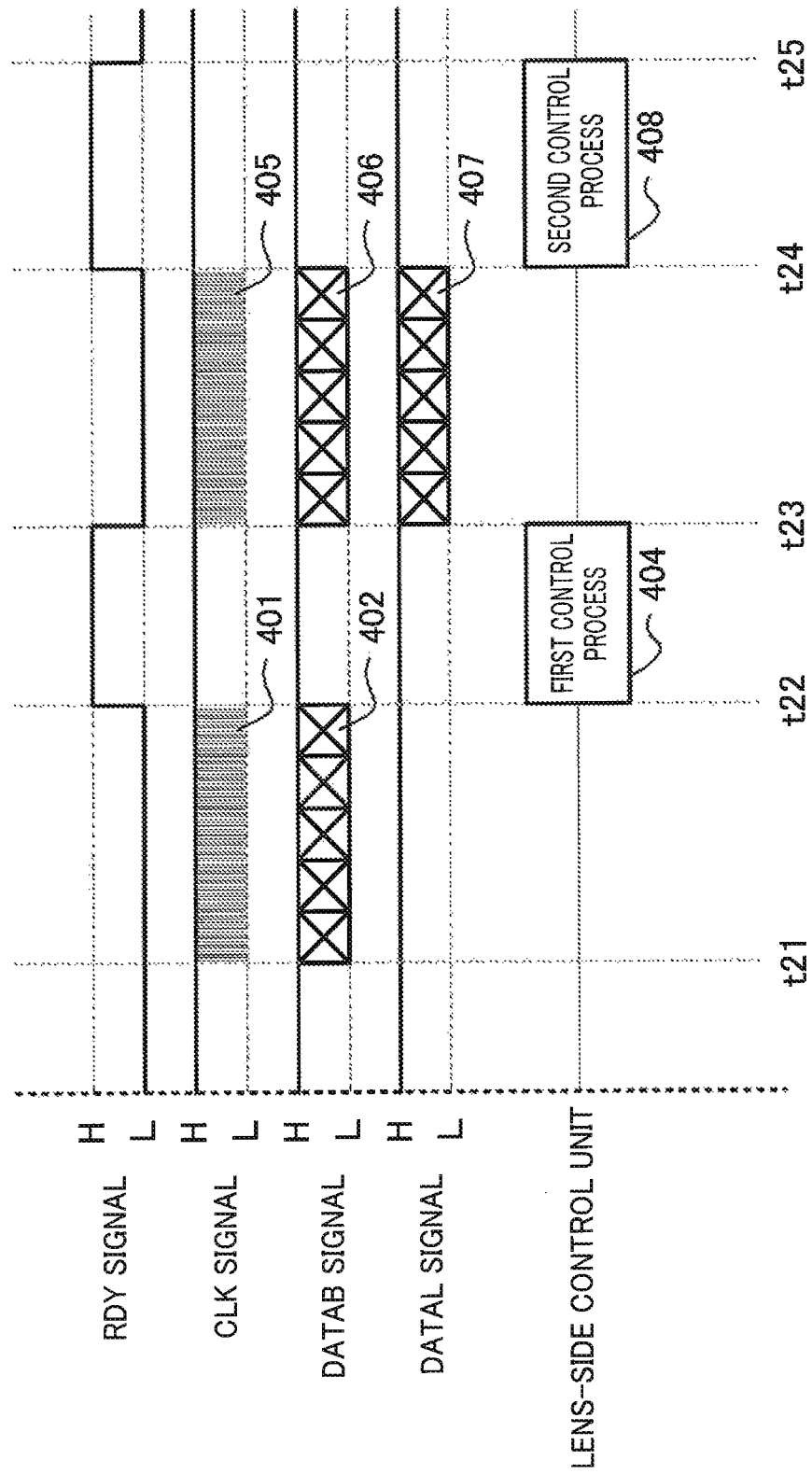
FIG. 3 is a view illustrating a timing of an RDY signal, a CLK signal, a DATAB signal, and a DATAL signal.

The command data communication will be described below with reference to FIG. 3. FIG. 3 illustrates a timing of the RDY signal, the CLK signal, the DATAB signal, and the DATAL signal.

In one command data communication, after one command packet 402 is transmitted from the camera body 2 to the interchangeable lens 3, data packets 406 and 407 (one packet from the camera body 2, the other packet from the interchangeable lens 3) are transmitted and received between the camera body 2 and the interchangeable lens 3.

The lens-side first communication section 340a sets a potential of the RDY signal to L level at the start of the command data communication (t21). When the RDY signal is at L level, the body-side first communication section 240a starts outputting a CLK signal 401. A frequency of the CLK signal 401 is 8 MHz, for example. The body-side first communication section 240a outputs a DATAB signal including the command packet 402 having a predetermined length, in synchronization with the clock signal 401. The command packet 402 is indicated by switching between H level and L level. After outputting the CLK signal 401 for a time period corresponding to the data length of the command packet 402, the body-side first communication section 240a ends the output of the CLK signal (t22).

The command packet 402 includes, for example, data for synchronization, data for identifying which number of command data communication, data indicating an instruction from the camera body 2, data indicating a data length of a subsequent data packet 406, data for communication error check. The instructions included in the command packet 402 include, for example, a drive instruction for the moving members from the camera body 2 to the interchangeable lens 3, and a data transmission instruction from the camera body 2 to the interchangeable lens 3.

The interchangeable lens 3 may determine the presence or absence of a communication error based on whether a value calculated from the received command packet 402 matches the data for communication error check included in the command packet 402.

Once the reception of the command packet 402 has been completed, the lens-side first communication section 340a sets the RDY signal to H level and the lens-side control unit 330 starts a first control process 404 based on the command packet 402 (t22).

Once the first control process 404 by the lens-side control unit 330 has been completed, the lens-side first communication section 340a can set the RDY signal to L level (t23). The body-side first communication section 240a outputs a CLK signal 405 when the input RDY signal becomes L level.

The body-side first communication section 240a outputs a DATAB signal including the data packet 406, in synchronization with the CLK signal 405. The lens-side first communication section 340a outputs a DATAL signal including the data packet 407 having a predetermined length, in synchronization with the CLK signal 405. The data packets 406 and 407 are indicated by switching between H level and L level. After outputting the CLK signal 405 for a time period corresponding to the data length of the data packet 406, the body-side first communication section 240a ends the output of the CLK signal (t24).

Data packets 406, 407 are variable-length data having the number of data specified by the command packet 402. The data packets 406 and 407 includes, for example, data for synchronization, data indicating information on the camera body 2, data indicating information on the interchangeable lens 3, and data for communication error check.

The data packet 406 transmitted from the camera body 2 to the interchangeable lens 3 includes data indicating drive amounts of the moving members, and data for transmitting settings and operation states in the camera body 2.

The data packet 407 transmitted from the interchangeable lens 3 to the camera body 2 includes data indicating information on a model name of the interchangeable lens 3, data indicating blurring correction control in the interchangeable lens 3, and data on optical characteristics of the imaging optical system 360.

A receiving-side apparatus (the interchangeable lens 3 or the camera body 2) may determine the presence or absence of a communication error based on whether a value calculated from the received data packets 406 and 407 matches the data for communication error check included in the data packets 406 and 407.

Once the reception of the data packets 406 and 407 has been completed, the lens-side first communication section 340a sets the RDY signal to H level and the lens-side control unit 330 starts a second control process 408 based on the data packet 406 and 407 (t24).

(Description of First and Second Control Processes)

Next, an example of the first control process 404 and the second control process 408 of the command data communication will be described.

For example, it is assumed that the command packet 402 includes a drive instruction of the focusing lens 361a. As the first control process 404, the lens-side control unit 330 generates a data packet 407 indicating that the drive instruction for the focusing lens 361a has been received.

Next, as the second control process 408, the lens-side control unit 330 instructs the lens drive unit 370a to move the focusing lens 361a by a moving distance indicated by the data packet 406. Thus, movement of the focusing lens 361a in the optical axis O direction is started. When the lens-side control unit 330 instructs the lens drive unit 370a to move the focusing lens 361a, the lens-side first communication section 340a regards that the second control process 408 is completed, and sets the RDY signal to L level (t25).

Further, for example, it is assumed that the command packet 402 includes an instruction of starting hotline communication. As the first control process 404, the lens-side control unit 330 generates a data packet 407 indicating that an instruction of starting the hotline communication is received. Next, as a second control process 408, the lens-side control unit 330 causes the lens-side second communication section 340b to start hotline communication. When the lens-side first communication section 340a starts the hotline communication, the lens-side first communication section 340a regards that the second control process 408 is completed, and sets the RDY signal to L level (t25).

Further, for example, it is assumed that the command packet 402 includes a drive instruction for blurring correction. As the first control process 404, the lens-side control unit 330 generates a data packet 407 indicating that the drive instruction for the blurring correction lens 361b has been received.

Next, as the second control process 408, the lens-side control unit 330 instructs the lens drive unit 370b to move the blurring correction lens 361b based on the correction rate and the blurring correction control instruction indicated by the data packet 406 and the output of the blurring sensor 390. Thus, movement of the blurring correction lens 361b in a direction intersecting the optical axis O is started. When the lens-side control unit 330 instructs lens drive unit 370b to move the blurring correction lens 361b, the lens-side first communication section 340a regards that the second control process 408 is completed, and sets the RDY signal to L level (t25).

<Description of Hotline Communication>

Figure 4:
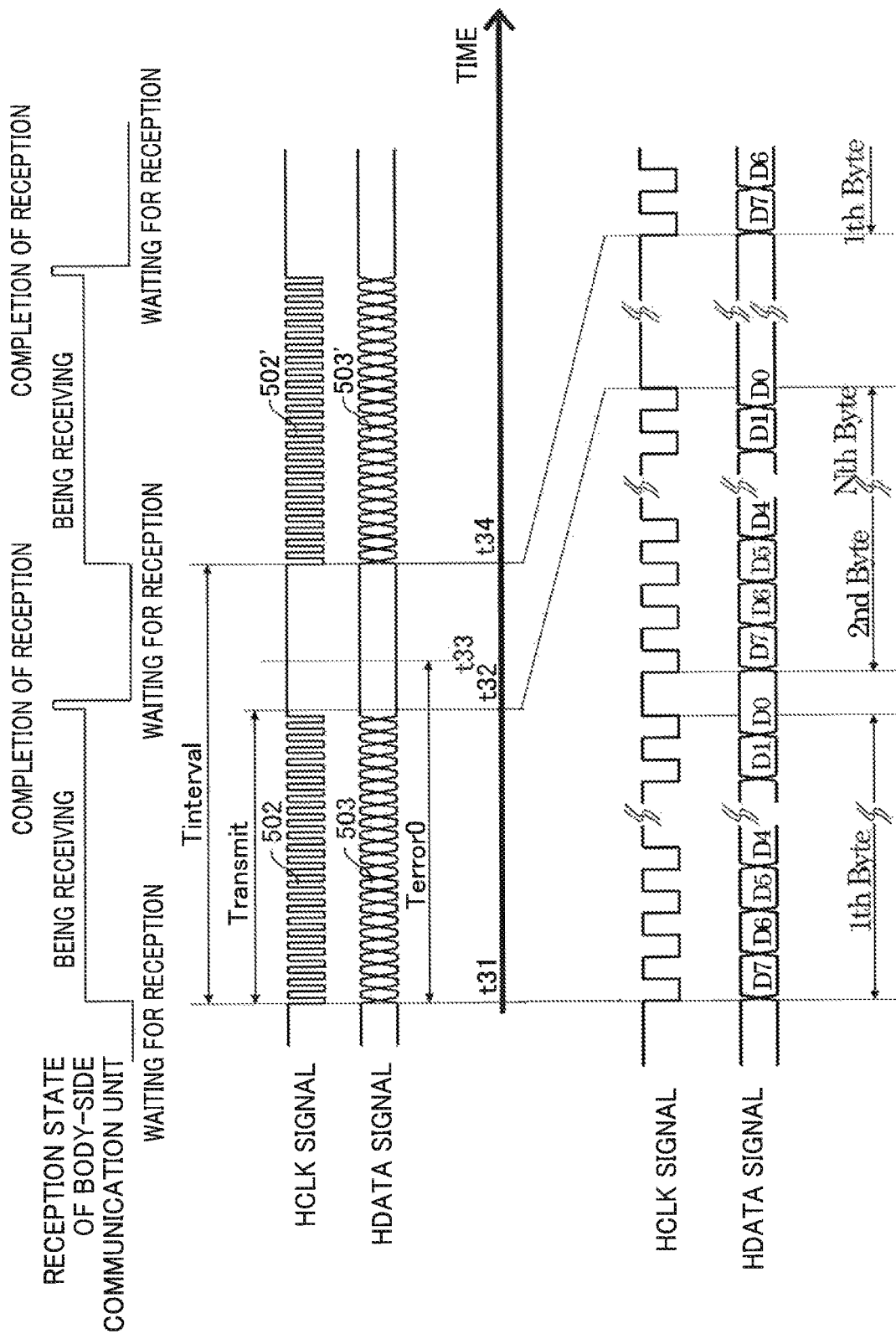
FIG. 4 is a view illustrating a timing of an HCLK signal and an HDATA signal.

The hotline communication will be described below with reference to FIG. 4. FIG. 4 illustrates a timing of the HCLK signal and the HDATA signal. One HDATA signal 503 is transmitted from the interchangeable lens 3 to the camera body 2 in synchronization with one HCLK signal 502 in one hotline communication.

In the camera system 1 according to the present embodiment, information on agreements for the hotline communication is determined between the interchangeable lens 3 and the camera body 2 before transmitting and receiving the instruction of starting the hotline communication. The information on agreements for the hotline communication includes, for example, a data length (the number of bytes) of a HDATA signal to be transmitted in one hotline communication, data to be included in the HDATA signal and an order of data, a clock frequency of the HCLK signal, a cycle (Tinterval in FIG. 4), a communication time in one cycle (Ttransmit in FIG. 4), and the like.

In the present embodiment, a frequency of the HCLK signal is 2.5 MHz, a data length of one hotline communication is longer than that of the command packet 402, a cycle of one hotline communication is 1 millisecond, and a communication time in one cycle is less than 75% of a transmission interval, but the invention is not limited thereto.

Note that one hotline communication, which means data transmission performed in one cycle of the hotline communication, is different from a period from the hotline communication start instruction to the hotline communication end instruction from the camera body 2 in the command data communication.

First, an operation of the lens-side second communication section 340b in the hotline communication will be described. When the instruction of starting the hotline communication is received in the command data communication before time t31, the lens-side second communication section 340b starts outputting a HCLK signal to the camera body 2 (t31). The HCLK signal is periodically output from the interchangeable lens 3 and shown in FIG. 4 as HCLK signals 502, 502', . . . .

The lens-side second communication section 340b outputs a HDATA signal in synchronization with the HCLK signal. The HDATA signal is indicated by switching between H level and L level. One HDATA signal has a predetermined data length and is represented as N×1 byte which includes eight bits D0 to D7 in FIG. 4.

One HDATA signal may include any unused bit area and any unused byte area to have a fixed length. A predetermined initial value is input to the unused bit area and the unused byte area. The HDATA signal is periodically output from the interchangeable lens 3 in synchronization with the HCLK signals 502, 502' . . . , and is represented as HDATA signals 503, 503', . . . in FIG. 4.

Once transmission of the HDATA signal has been completed (t32), the lens-side second communication section 340b stops outputting the HCLK signal until time t34 when the next transmission of the HDATA signal is started. The period from time t31 to time t32 is one hotline communication, and the period from time t31 to time t34 is one cycle of the hotline communication. The lens-side second communication section 340b starts a second hotline communication from time t34. The lens-side second communication section 340b periodically continues the hotline communication until the instruction of ending the hotline communication is transmitted from the camera body 2 in the command data communication.

The lens-side second communication section 340b transmits the HDATA signals 503, 503', . . . to the body-side second communication section 240b by an integrated serial communication unit. The lens-side second communication section 340b uses a DMA (Direct Memory Access) function, for example, to efficiently transfer data stored in a data area of a memory (not shown) as an HDATA signal. The DMA function is a function of automatically accessing data on the memory without intervention of a CPU.

Next, an operation of the body-side second communication section 240b in the hotline communication will be described. In the present embodiment, when an initialization process at a time of power on is completed, or when transmission of a hotline communication start instruction is determined in the command data communication, the body-side second communication section 240b waits in a receivable state.

When transmission of the HDATA signal is started from the interchangeable lens 3 and reception of data having a predetermined length is completed (t32) before the elapse (time t33) of a predetermined time period Terror0 from the start time t31, the body-side second communication section 240b determines that communication of the received data has been successfully performed. The predetermined time period Terror0 is a time period obtained by adding a margin to a communication time period Ttransmit in one cycle and is 80% of one cycle, for example. After receiving the HDATA signal once, the body-side second communication section 240b continues to wait in the receivable state. After one cycle is elapsed from time t31, the body-side second communication section 240b starts receiving the next HDATA signal (t34).

If reception of data having a predetermined length is not completed within a predetermined time period Terror0 since the start of transmission of the HDATA signal by the lens-side communication unit 340, the body-side second communication section 240b discards the received data as "communication was unsuccessful" (communication error).

Note that, in the hotline communication, it is preferable that the communication time period (Ttransmit) in one cycle does not exceed 75% so that a communication error process and the like can be performed during each cycle (from time t33 to time t34), but the invention is not limited thereto.

<Hotline Data>

In one hotline communication, one hotline data 90 is transmitted from the interchangeable lens 3 to the camera body 2.

The hotline data 90 can include at least two types of information, that is, the positional information of the moving member and information different from the positional information of the moving member, for each moving member.

In the present embodiment, the hotline data 90 includes first data 91 including positional information of the focusing lens 361a and information that can be used to calculate a drive amount of the focusing lens 361a, and second data 92 including positional information of the blurring correction lens 361b and information that can be used to calculate a drive amount of the blurring correction lens 361b. The information included in the first data 91 and the information included in the second data may be the same or partially different. The camera body 2 may calculate the drive amount of the moving member using or without using the information transmitted in the hotline communication.

The information different from the positional information of the moving member is information that can be used to calculate the drive amount of the moving member and can be set for each moving member. For example, such information includes at least one of a reliability of the positional information, movement states of the moving members, and operation states of the operation members such as the instruction unit 375. The above-described information and statuses are expressed in the form of numerical values and identifiers by the lens-side control unit 330 and the lens-side second communication section 340b, and are included in the hotline data 90.

The positional information indicating the position of the moving member indicates a relative or absolute position of the focusing lens 361a in the direction of the optical axis O when the moving member is the focusing lens 361a, and includes the number of pulses of the actuator of the lens drive unit 370a and a detection value detected by the lens drive unit 370a.

The positional information indicating the position of the moving member indicates a relative or absolute position of the blurring correction lens 361b in the plane intersecting the optical axis O when the moving member is the blurring correction lens 361b, and includes a coordinate value of the optical axis O' and the moving distance of the blurring correction lens 361b in the plane intersecting the optical axis O.

The reliability of the positional information is represented by an identifier indicating whether the positional information is valid or invalid and a numerical value indicating the reliability of the positional information.

The movement state of the moving member is represented by an identifier indicating whether the moving member is moving, an identifier indicating whether the moving member is in a movable state, an identifier indicating whether the moving member is being stopped to be driven, an identifier indicating whether the moving member is being driven, and an identifier indicating a movement direction of the moving member.

The operation state of the operation member such as the instruction unit 375 is represented by an identifier indicating the antivibration mode instructed by the instruction unit 375 and an identifier indicating the presence or absence of the instruction unit 375.

(Description of Second Data 92)

FIG. 5 is a view illustrating information included in the second data 92.

The second data 92 includes, for example, at least one of data 92h and 92i on a position of the blurring correction lens 361b, data 92a to 92d on blurring state based on the detection signal from the blurring sensor 390, data 92e and 92f on reliability of the blurring correction amount or the calculated blurring amount, data 92g on a movement state of the blurring correction lens 361b, and data 92q indicating an instruction by the instruction unit 375.

The data 92a to 92d relates to the blurring state based on the detection signal from the blurring sensor 390 and includes an identifier selected by the lens-side control unit 330 or blurring sensor 390 based on the detection signal from the blurring sensor 390.

The lens-side control unit 330 determines the blurring state from the detection signal of the blurring sensor 390. In the present embodiment, as the blurring state, a state of composition changing, a state of stable composition, and a state of tripod fixation are determined. The lens-side control unit 330 selects an identifier indicating whether the composition is changing, an identifier indicating whether the composition is stable, and an identifier indicating whether the camera body is fixed to the tripod, and transmits each of the identifiers to the camera body 2 by including in the hotline data 90.

For example, based on the angular blurring detection signal in the X-axis direction output from the angular velocity sensor 390a, the lens-side control unit 330 selects an identifier indicating whether the composition is changing, an identifier indicating whether the composition is stable, and an identifier indicating whether the camera body is fixed to the tripod, and sets the identifiers as the data 92a.

The data 92b is different from the data 92a in that the above-described determination is made in the Y-axis direction.

The data 92c is different from the data 92a in that the above-described determination is made for translational blurring.

The data 92d is different from the data 92a in that the above-described determination is made for translational blurring in the Y-axis direction.

The body-side control unit 230 can know the determination result of the blurring state in the interchangeable lens 3 from the data 92a to 92d, and can cause the blurring state of the interchangeable lens 3 and the blurring state of the camera body 2 to match each other.

The data 92g relates to the movement state of the blurring correction lens 361b and includes an identifier selected by the lens-side control unit 330. In the present embodiment, the blurring control state may include, for example, a state during still-image antivibration, a state during moving-image antivibration, and a state during non-blurring correction. The state during non-blurring correction is a state in which the lens drive unit 370b is not driven and blurring correction is not performed.

The state during still-image antivibration is a state in which a suitable blurring correction is being performed during imaging of a still image, based on a still-image antivibration start instruction and the shutter speed transmitted from the camera body 2 in the command data communication.

The state during moving-image antivibration is a state in which a suitable blurring correction is being performed during imaging of a moving image or imaging of a live view image, based on a moving-image antivibration start instruction transmitted from the camera body 2 in the command data communication.

In the present embodiment, the effect of the blurring correction during the moving-image antivibration is set to be stronger than that during still-image antivibration during high-speed photographing.

The body-side control unit 230 can know the movement state of the blurring correction lens 361b from the data 92g.

The data 92h and 92i relates to the position of the blurring correction lens 361b and is represented by a numerical value indicating the position of the blurring correction lens 361b or a numerical value indicating the moving distance of the blurring correction lens 361b.

The data 92h indicates a current position of the optical axis O' of the blurring correction lens 361b in the X-axis direction. In the present embodiment, the data 92h represents coordinate values in the X-axis direction detected in the interchangeable lens 3 converted into coordinate values (image plane conversion values) on the imaging surface 260S of the imaging sensor 260. The image plane conversion value is calculated by multiplying the coordinate value of the blurring correction lens 361b, which is detected by the interchangeable lens 3, by an antivibration coefficient. The antivibration coefficient represents a moving distance of the image plane on the imaging surface 260S with respect to a unit moving distance of the blurring correction lens 361b. The antivibration coefficient is a value that varies depending on a focal length and photographing distance of the imaging optical system 360, and is stored in the lens-side storage unit 350.

The lens-side control unit 330 reads an antivibration coefficient according to the focal length and the photographing distance when the coordinate value of the blurring correction lens 361b is detected, from the lens-side storage unit 350, and calculates the image plane conversion value. The calculation of the image plane conversion value in the interchangeable lens 3 has an effect that it is not necessary to transmit the antivibration coefficient according to the focal length and the photographing distance, to the camera body 2, but a value before the image plane conversion may be transmitted in the hotline communication.

The data 92i is different from the data 92h in that the above-described determination is made in the Y-axis direction.

The data 92e and 92f relates to the reliability of the positional information on the blurring correction lens 361b and the reliability of the calculated blurring amount and blurring correction amount, and includes an identifier selected based on the reliability of the data 92h to 92o by the lens-side control unit 330. In the present embodiment, the data 92e and 92f indicates whether the data 92h to 92o are individually valid. However, the invention is not limited thereto.

The body-side control unit 230 can know the reliability of the data 92h to 92o from the data 92e and 92f.

The data 92q represents an instruction by the instruction unit 375, and includes, for example, an identifier indicating either of the sports mode or the normal mode instructed by the instruction unit 375 or the presence or absence of the instruction unit 375. The lens-side control unit 330 causes the data 92q to include an identifier indicating that the instruction unit 375 is absent in the case of the interchangeable lens 3 not including the instruction unit 375.

<Description of Blurring Correction>

The camera system 1 according to the present embodiment can perform a lens-side blurring correction performed by the lens drive unit 370b driving the blurring correction lens 361b and a body-side blurring correction performed by the sensor drive unit 265 driving the imaging sensor 260. Therefore, the lens-side blurring correction and the body-side blurring correction can cooperate with each other to improve a blurring correction effect.

In the lens-side blurring correction and the body-side blurring correction, the control can be appropriately changed according to each setting related to the blurring correction and the blurring state.

For example, a movable range of the blurring correction lens 361b or the imaging sensor 260 (hereinafter, referred to as a movable unit) or a frequency band of the blurring to be corrected can be changed according to the blurring state. In the tripod fixation state, a blurring detection signal in a frequency band of approximately 10 Hz or more which is likely to be generated during the tripod fixation may be extracted and corrected. In the composition changing state, the frequency band may be limited to a specific range or the movable range may be reduced so as not to correct the blurring of the interchangeable lens 3 intended by the user due to a change in the composition. In the composition stable state, a frequency band range may be made wider than that in the composition changing state and the movable range may be made larger; for example, the movable range may be matched with a mechanical movable range.

In addition, the frequency band of the blurring to be corrected and the movable range of the movable unit can be changed according to the antivibration mode and the shutter speed. When the antivibration mode is the sports mode, the movable range may be reduced in order to cope with photographing at a shutter speed faster than that in the normal mode. When the antivibration mode is in the normal mode, the movable range can be made larger than that in the sports mode to enhance the effect of the blurring correction.

In addition, the blurring correction control may be changed between the still image photographing and the moving image photographing.

During the moving image photographing, the frequency band may be widened or the movable range may be widened so that the blurring can also be largely corrected. During the still image photographing, the frequency band is made narrow compared with during the moving image photographing to reduce noise, so that the accuracy may be improved. In the present embodiment, any one of two types of instructions including still-image antivibration start instruction and the moving-image antivibration start instruction is transmitted from the camera body 2 to the interchangeable lens 3 in the command data communication, and thus the interchangeable lens 3 can perform blurring correction control suitable for the still image or the moving image.

The moving-image antivibration start instruction includes a second correction rate (Gω2, Gα2) indicating a sharing ratio of the blurring correction in the interchangeable lens 3 (see FIG. 9). The second correction rate (Gω2, Gα2) indicates a ratio of the blurring correction of the interchangeable lens 3 when the interchangeable lens 3 and the camera body 2 cooperate with each other to correct the blurring. The second correction rate (Gω2, Gα2) indicates a ratio of the blurring correction of the camera body 2, and the lens-side control unit 330 may calculate a ratio of the blurring correction of the interchangeable lens 3 so as to be 100% together with the ratio of the blurring correction of the camera body 2. The second correction rate (Gω2, Gα2) can be set for angular blurring and translational blurring, respectively. The second correction rate is set by a combination of the second correction rate Gω2 for the angular blurring correction and the second correction rate Gα2 for the translational blurring correction.

Further, the still-image antivibration start instruction includes the second correction rate according to the shutter speed. When the second correction rate changes due to the change in the shutter speed, the still-image antivibration start instruction is transmitted from the camera body 2 to the interchangeable lens 3 again by the change in the second correction rate. The shutter speed depends on an accumulation time of a photoelectric conversion unit of the imaging sensor 260 and a drive speed of a mechanical shutter mechanism when the mechanical shutter mechanism is provided, and may be an electrical shutter speed or a mechanical shutter speed.

In the present embodiment, the second correction rate according to the shutter speed is transmitted from the camera body 2 to the interchangeable lens 3 in the command data communication together with the still-image antivibration start instruction, but the interchangeable lens 3 stores the second correction rate according to the shutter speed and the information on the shutter speed may be sent from the camera body 2 in the command data communication.

The camera body 2 may change the second correction rate depending on the blurring correction setting (antivibration mode or blurring state). When the second correction rate changes, the moving-image antivibration start instruction or the still-image antivibration start instruction subjected to change the second correction rate is transmitted from the camera body 2 to the interchangeable lens 3 again.

<Calculation of Target Position for Blurring Correction>

Figure 6:
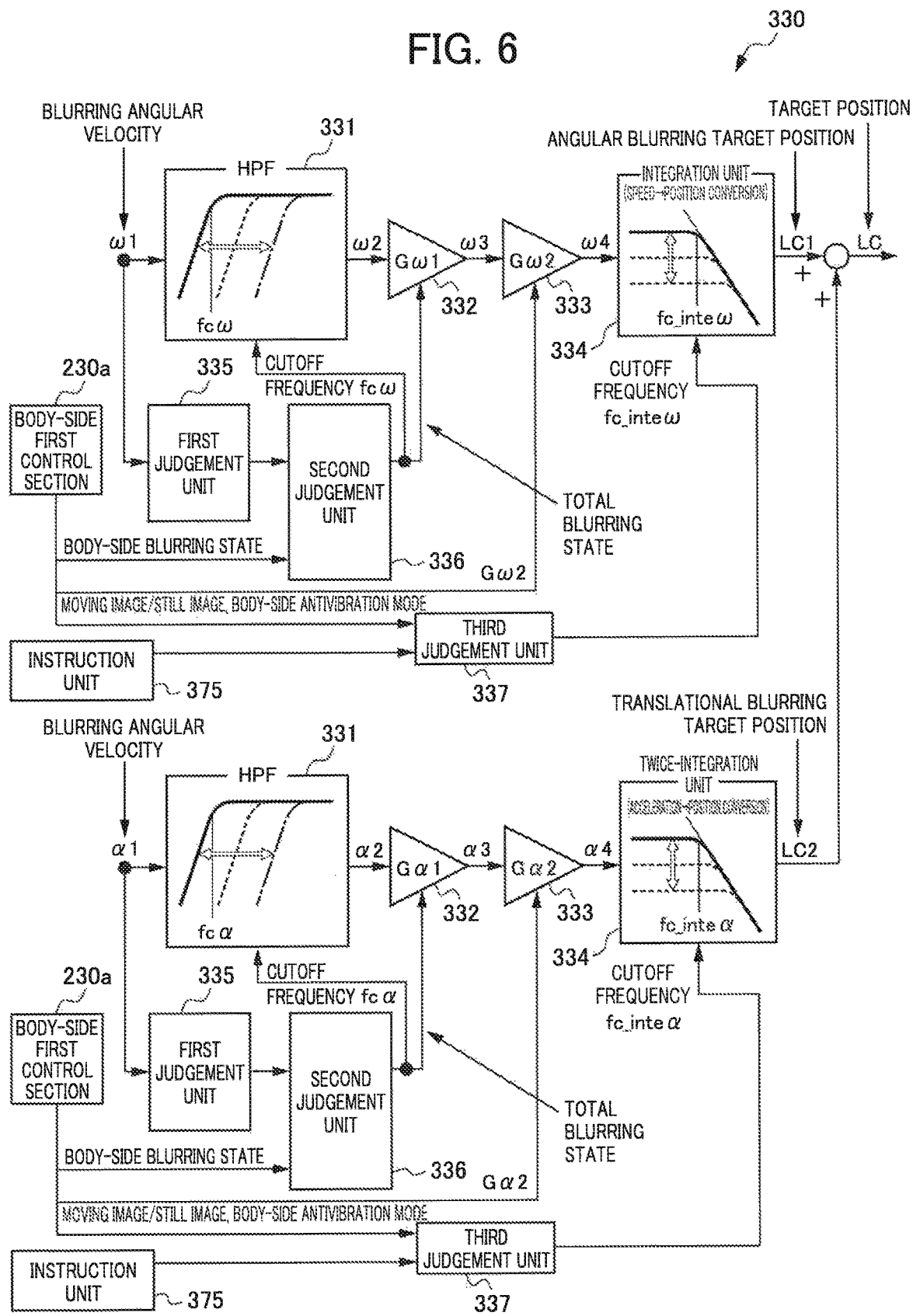
FIG. 6 is a view illustrating a calculation of a drive amount of a blurring correction lens 361b by a lens-side control unit 330.

A calculation of a drive amount of the blurring correction lens 361b by the lens-side control unit 330 will be described below with reference to FIG. 6. In the present embodiment, the drive amount is a drive amount of the blurring correction lens 361b required to correct the blurring up to a target position, and is also referred to as a total blurring amount. In addition, the target position of the blurring correction lens 361b is calculated as the drive amount.

The body-side second control section 230b of the camera body 2 calculates a target position of the imaging sensor 260 as a drive amount of the blurring correction, similarly to the lens-side control unit 330.

The lens-side control unit 330 calculates a target position LC1 for correction of the angular velocity blurring around the X-axis based on the detection signal of the angular velocity sensor 390a and a target position LC2 for correction of the acceleration blurring in the X-axis direction based on the detection signal of the acceleration sensor 390b, and calculates a target position LC for correction of the blurring of the blurring correction lens 361b in the X-axis direction.

In the above description, only the X-axis is described, but the lens-side control unit 330 calculates a target position LC1' for correction of the angular velocity blurring around the Y-axis based on the detection signal of the angular velocity sensor 390a and a target position LC2' for correction of the translational blurring in the Y-axis direction based on the detection signal of the acceleration sensor 390b, and calculates a target position LC' for correction of the blurring in the Y-axis direction. Hereinafter, since operations of the X-axis and the Y-axis are the same, only the X-axis will be described.

The lens-side control unit 330 includes a filter unit 331, a first change unit 332, a second change unit 333, an integration unit 334, a first judgement unit 335, a second judgement unit 336, and a third judgement unit 337. A blurring angular velocity $\omega 1$ detected by the angular velocity sensor 390a is input to the filter unit 331. The filter unit 331 cuts a predetermined cutoff frequency fcω or less from the blurring angular velocity $\omega 1$, and outputs a blurring angular velocity $\omega 2$ to the first change unit 332.

The first change unit 332 multiplies a predetermined first angular blurring correction rate Gω1 by the blurring angular velocity $\omega 2$, and outputs a blurring angular velocity $\omega 3$ to the second change unit 333. The second change unit 333 multiplies a predetermined second angular blurring correction rate Gω2 by the blurring angular velocity $\omega 3$, and outputs a blurring angular velocity $\omega 4$ to the integration unit 334. The integration unit 334 integrates the blurring angular velocity $\omega 4$, and outputs the target position LC1 of the blurring correction lens 361b for the correction of the angular blurring.

The first judgement unit 335 receives the detection signal (blurring angular velocity $\omega 1$) output from the angular velocity sensor 390a, and judges a lens-side blurring state related to the angular blurring generated in the interchangeable lens 3.

In the present embodiment, the blurring state includes at least one of a composition changing state, a stable composition state, and a tripod fixation state. The composition changing state is a state in which the user swings the interchangeable lens 3 in a horizontal or vertical direction and the composition is changed. The stable composition state is a state in which the user fixes the position of the interchangeable lens 3 and the composition is stable. The tripod fixation state is a state in which the interchangeable lens 3 or the camera body 2 is fixed to the tripod.

The lens-side blurring state judged by the first judgement unit 335 is input to the second judgement unit 336. Further, the lens-side blurring state judged by the first judgement unit 335 is transmitted to the camera body 2 in hotline communication to be described below.

Here, the body-side second control section 230b judges, based on the detection signal of the angular velocity sensor 290a, a body-side blurring state related to the angular blurring generated in the camera body 2. The body-side second control section 230b judges, as a blurring state, a lens-side priority state in addition to the same composition changing state, stable composition state, and tripod fixation state as in the lens-side control unit 330. The lens-side priority state is a state in which, when judges for the interchangeable lens 3 and the camera body 2 do not match with respect to the blurring state, the judges for the interchangeable lens 3 is prioritized due to the user's setting.

The body-side blurring state judged by the body-side second control section 230b is transmitted to the lens-side control unit 330 in command data communication to be described below, and is input to the second judgement unit 336. Therefore, the lens-side blurring state and the body-side blurring state are input to the second judgement unit 336. The second judgement unit 336 judges, based on the lens-side blurring state and the body-side blurring state, a total blurring state of the angular blurring.

As shown in FIG. 7, the second judgement unit 336 judges that the lens-side blurring state is the total blurring state when the body-side blurring state is the lens-side priority state, and judges that the body-side blurring state is the total blurring state when the body-side judge result is other than the lens-side priority state.

The second judgement unit 336 stores a relation among a total blurring state for angular blurring, a threshold value, and a coefficient (FIG. 8), outputs a cutoff frequency fcω corresponding to the total blurring state for the angular blurring to the filter unit 331, and outputs a first correction rate Gω1 to the first change unit.

The second change unit 333 receives a second correction rate Gω2 that is judged by the body-side first control section 230a and is transmitted in the command data communication.

In the present embodiment, the sum of a second correction rate of the camera body 2 and a second correction rate of the interchangeable lens 3 is set to be 1. The body-side first control section 230a stores a relation among a still-image/moving-image antivibration, a shutter speed, and a second correction rate as shown in FIG. 9. In the present embodiment, the second correction rate in the X-axis direction and the second correction rate in the Y-axis direction are the same, but the invention is not limited thereto. Further, the second correction rate Gω2 for the angular blurring and the second correction rate Gα2 for the translational blurring are the same, but the invention is not limited thereto.

In the present embodiment, when the shutter speed is fast, the interchangeable lens 3 performs the blurring correction suitable for high-speed photographing, and when the shutter speed is not fast, the blurring correction of the interchangeable lens 3 cooperates with the blurring correction of the camera body 2 to increase the effect of blurring correction.

Therefore, when the shutter speed is faster than, for example, 1/60 seconds in the still-image antivibration, the second correction rate of the interchangeable lens 3 is set to 1, and the second correction rate of the camera body 2 is set to 0. When the shutter speed is slower than, for example, 1/60 seconds in the moving-image antivibration or the still-image antivibration, the second correction rate of the interchangeable lens 3 is set to 0.5, and the second correction rate of the camera body 2 is set to 0.5. The second correction rate can be changed as appropriate, and when the camera body 2 does not have the blurring correction function, the second correction rate of the interchangeable lens 3 is set to 1 and the second correction rate of the camera body 2 is set to 0.

Further, when the interchangeable lens 3 has the angular blurring correction function but does not have the translational blurring correction function, the second correction rate for the angular blurring is set as described above, and the second correction rate for the translational blurring of the interchangeable lens 3 is set to 0 and the second correction rate for the translational blurring of the camera body 2 is set to 1. The second correction rate may be adjusted according to the accuracy of the blurring correction function of the camera body 2 and the interchangeable lens 3. The second correction rate is transmitted from the camera body 2 to the interchangeable lens 3 in the command data communication of the antivibration start instruction. However, correction rate change command data communication is provided, and the second correction rate may be transmitted every time the second correction rate is changed after the antivibration is started.

The third judgement unit 337 receives an instruction regarding the blurring correction transmitted from the body-side first control section 230*a* in the command data communication. The instruction regarding the blurring correction transmitted from the camera body 2 includes whether the blurring correction control is for either of the moving-image antivibration or the still-image antivibration or whether the antivibration mode is any one of the sports mode, the normal mode, and the lens-side priority mode. Further, the third judgement unit 337 receives the antivibration mode, which is set by the user, from the instruction unit 375.

The third judgement unit 337 stores a relation between the instruction regarding the blurring correction (still-image/moving-image antivibration, antivibration mode) and a threshold value (frequency band, cutoff frequency fc_inteω) shown in FIG. 10, and outputs the corresponding cutoff frequency fc_inteω to the integration unit 334. In the present embodiment, the cutoff frequency fc_inteω in the sports mode is made larger than the cutoff frequency fc_inteω in the normal mode, the invention is not limited thereto. The integration unit 334 integrates based on the blurring angular velocity ω4 and the cutoff frequency fc_inteω, and calculates the target position LC1 for the angular blurring.

The lens-side control unit 330 calculates the translational blurring target position LC2 required for correcting the translational blurring in the same manner as the calculation of the angular blurring target position LC1 required for correcting the blurring angular velocity, and adds and subtracts the target positions LC1 and LC2 to calculate a final target position LC.

Here, a description will be made with respect to differences between the calculation of the translational blurring target position LC2 by the lens-side control unit 330 and the calculation of the angular blurring target position LC1. The components 331 to 337 for calculating the angular blurring target position LC1 are equal to the components 331 to 337 for calculating the translational blurring target position LC2, but the invention is not limited thereto.

A blurring acceleration α1 detected by the acceleration sensor 390*b* is input to the filter unit 331. The filter unit 331 cuts a predetermined cutoff frequency fcα or less, and outputs a blurring acceleration α2 to the first change unit 332. The first change unit 332 multiplies a predetermined first correction rate Gα1 for translational blurring by the blurring acceleration α2, and outputs a blurring acceleration α3 to the second change unit 333. The second change unit 333 multiplies a predetermined second translational blurring correction rate Gα2 by the blurring acceleration α3, and outputs a blurring acceleration α4 to the integration unit 334. The integration unit 334 integrates twice based on the blurring acceleration α4 and the cutoff frequency fc_inteα, and outputs a target position LC2 for the translational blurring correction of the blurring correction lens 361*b*.

The second judgement unit 336 stores a relation among a total blurring state for the translational blurring, a cutoff frequency fcα, and a first correction rate Gα1 (FIG. 11), outputs a cutoff frequency fcα corresponding to the total blurring state to the filter unit 331, and outputs the first correction rate Gα1 to the first change unit 332.

The second change unit 333 receives the second correction rate Gα2 for translational blurring that is judged by the body-side first control section 230*a* and is transmitted in the command data communication. The third judgement unit 337 stores a relation among a still-image/moving-image antivibration, an antivibration mode, and a cutoff frequency fc_inteα shown in FIG. 12, and outputs a corresponding cutoff frequency fc_inteα to the integration unit 334.

In the present embodiment, the cutoff frequency fc_inteα at the translational blurring target position LC2 is made larger than the cutoff frequency fc_inteω at the angular blurring target position LC1, but the invention is not limited thereto.

A description will be made below with respect to differences between a calculation of a target position BC1 of the imaging sensor 260 for correction of the angular blurring by the body-side second control section 230*b* and a target position BC2 of the imaging sensor 260 for correction of the acceleration blurring and the calculation of the target positions LC1 and LC2 by the lens-side control unit 330. Although components 331 to 337 are described as components for calculating the target positions BC1 and BC2, the components may be different from the components of the lens-side control unit 330.

In the present embodiment, the body-side second control section 230*b* includes a filter unit 331, a first change unit 332, a second change unit 333, and an integration unit 334, and the body-side first control section 230*a* includes a first judgement unit 335, a second judgement unit 336, and a third judgement unit 337 to transmit the judgement result to the body-side second control section 230*b*, but can be changed as appropriate.

The body-side second control section 230b outputs the target positions BC1 and BC2 based on the blurring angular velocity ω1 detected by blurring velocity sensors 290a and 290b, the blurring acceleration α1, the cutoff frequencies fcω and fcα, the first correction rates Gω1 and Gα1, the body-side second correction rates Gω2 and Gα2, and the cutoff frequencies fc_inteω and fc_inteα. The same applies to X-axis and the Y-axis.

The first judgement unit 335 of the body-side first control section 230a determines, based on the output of the blurring sensor 290, the body-side blurring state for each of the angular blurring and the angular velocity blurring. Further, the second judgement unit 336 of the body-side first control section 230a judges, based on the body-side blurring state and the lens-side blurring state transmitted from the interchangeable lens 3 in the hotline communication, a total blurring state, and judges the cutoff frequencies fcω and fcα and the first correction rates Gω1 and Gα1. The judgement method is the same as that of the lens-side control unit 330.

Further, the third judgement unit 337 of the body-side first control section 230a determines the cutoff frequencies fc_inteω and fc_inteα, based on the information indicating whether to be moving image photographing or still image photographing, which is recognized by the body-side first control section 230a, the body-side antivibration mode, and the lens-side antivibration mode transmitted from the interchangeable lens 3 in the hotline communication. The determination method is the same as that of the lens-side control unit 330.

In the camera body 2 and the interchangeable lens 3 of the present embodiment, the variables and the threshold values (the first correction rate and the cutoff frequency) used for calculating the target positions LC and BC match with each other. Therefore, it is possible to reduce a sense of discomfort in the effect of the blurring correction that occurs when the first correction rate or the cutoff frequency in the camera body 2 does not match with that in the interchangeable lens 3. The coefficients and the threshold values may be deviated in the camera body 2 and the interchangeable lens 3 to the extent that the effect of the blurring correction does not cause a sense of discomfort.

As for the second correction rate, the sum of the lens-side second correction rate (the sharing ratio of the interchangeable lens 3 for the blurring correction) and the body-side second correction rate (the sharing ratio of the camera body 2 for the blurring correction) is set to 1 (or 100%). Accordingly, it is possible to improve the effect of the blurring correction without excessively preforming the blurring correction or reducing the blurring correction too much by cooperating the blurring correction in the interchangeable lens 3 and the blurring correction in the camera body 2 with each other.

Although the second judgement unit 336 is provided on both of the lens-side control unit 330 and the body-side second control section 230b, the total blurring state may be transmitted from the camera body 2 to the interchangeable lens 3 in the command data communication. In such a case, it is not necessary for the lens-side control unit 330 to transmit the lens-side blurring state from the first judgement unit 335 to the second judgement unit 336, and the second judgement unit 336 does not need to store and refer to the correlation of FIG. 7.

Further, the second judgement unit 336 is provided on both of the lens-side control unit 330 and the body-side second control section 230b to judge the total blurring state, the cutoff frequency, and the first correction rate in FIGS. 8 and 11, but the cutoff frequency and the first correction rate may be transmitted from the camera body 2 to the interchangeable lens 3 in the command data communication. In such a case, it is not necessary for the lens-side control unit 330 to transmit the lens-side blurring state from the first judgement unit 335 to the second judgement unit 336, and the second judgement unit 336 is not also provided.

Similarly, the third judgement unit 337 is provided on both of the lens-side control unit 330 and the body-side second control section 230b to judge the cutoff frequency of the integration unit 334 in FIGS. 10 and 12, but the cutoff frequency may be transmitted and received to/from the camera body 2 and the interchangeable lens 3. In such a case, the determination of the cutoff frequency in either of the lens-side control unit 330 or the body-side second control section 230b can be omitted.

The lens-side control unit 330 further reads out an antivibration coefficient at a time when the detection signal is output, and calculates an image plane conversion value of the target position LC based on the total blurring amount and the antivibration coefficient. Here, the lens-side control unit 330 calculates the image plane conversion value without taking the drive range (a mechanical movable range and a controlled movable range) of the blurring correction lens 361b into consideration. Here, the mechanical movable range refers to a movable range based on a holding mechanism of the blurring correction lens 361b, and the controlled movable range refers to a movable range limited by user settings and photographing conditions.

The lens-side control unit 330 also calculates the target position of the blurring correction lens 361b in the X-axis direction and the Y-axis direction in consideration of the mechanical movable range and the controlled movable range. The moving distance may be calculated as a difference between the target position and the current position (difference in coordinate values) in the X-axis direction and the Y-axis direction.

The lens-side control unit 330, which has calculated the moving distance or target positions of the blurring correction lens 361b, outputs a drive signal to the lens drive unit 370b to drive the blurring correction lens 361b. The lens drive unit 370b having received the drive signal moves the blurring correction lens 361b in the X-axis and Y-axis directions that intersect the optical axis O.

Further, the lens drive unit 370b periodically detects positions of the blurring correction lens 361b in the X-axis direction and the Y-axis direction to output the positions as current positions to the lens-side control unit 330. The lens-side control unit 330 may use values output from the lens drive unit 370b as the data 92h and 92i as they are, or may set values subjected to calculation such as image plane conversion as the data 92h and 92i.

The body-side second control section 230b creates a drive signal based on at least one of the positional information on the blurring correction lens 361b received in the hotline communication, the instruction from the body-side first control section 230a, and the detection signal output from the blurring sensor 290, and outputs the drive signal to the sensor drive unit 265. The sensor drive unit 265 having received the drive signal moves the imaging sensor 260 in the X-axis and Y-axis directions that intersect the optical axis O.

Next, an example of the antivibration operation will be described with reference to FIGS. 13 and 14.

<Antivibration Operation During Moving Image Photographing>

Figure 13:
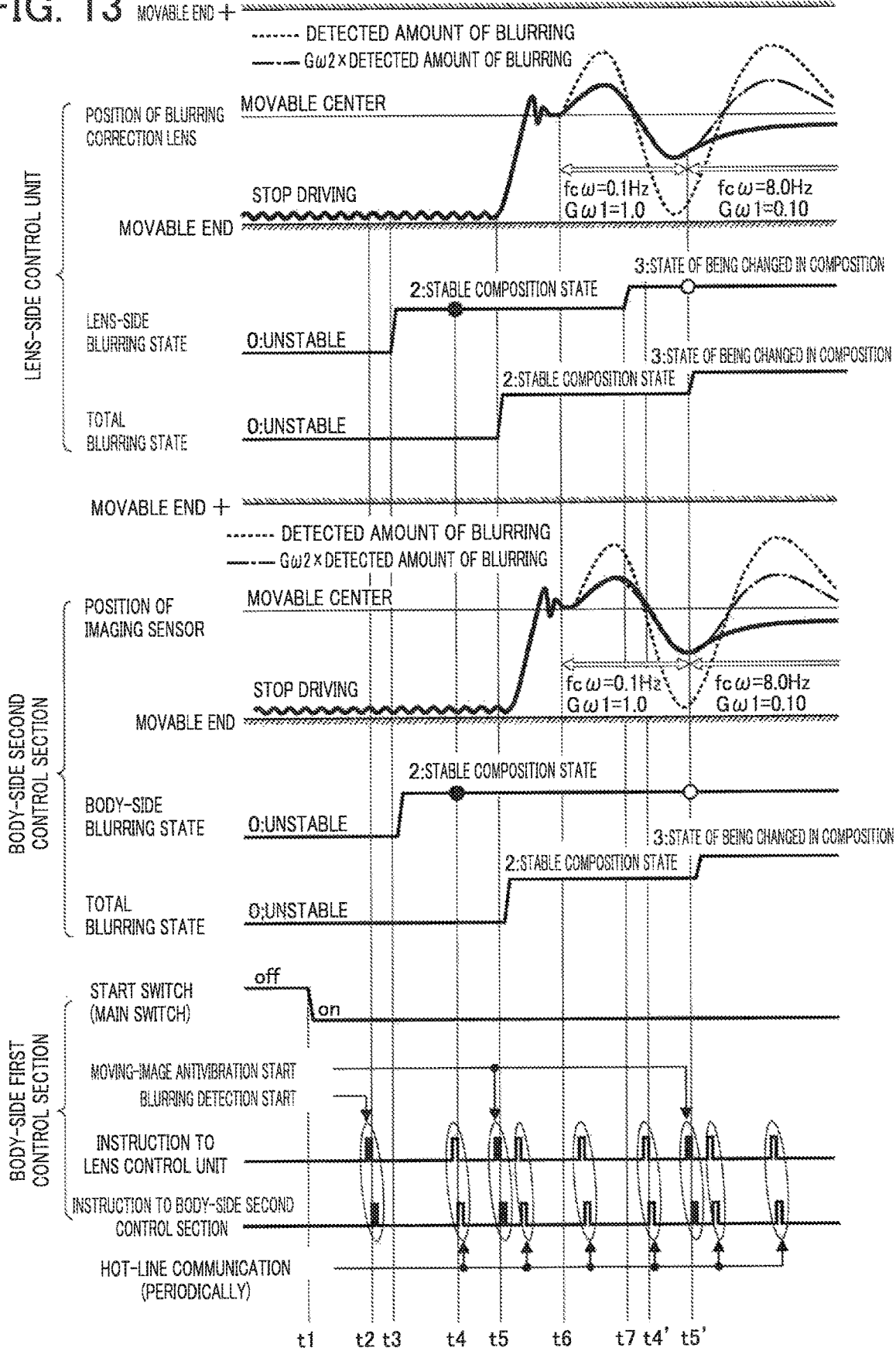
FIG. 13 is a timing chart showing a blurring correction state at the time of moving image photographing.

FIG. 13 is a timing chart showing a state of the blurring correction state during the moving image photographing.

Originally, there is a timing chart for two axes of the X-axis and the Y-axis, but since the X-axis and the Y-axis are almost the same, only the operation for one axis will be described. In FIGS. 13 and 14, the angular blurring is shown, and the translational blurring is not shown because of being similar to the angular blurring. In FIGS. 13 and 14, it is assumed that the lens-side priority state is selected as the body-side blurring state. Further, the antivibration mode is not changed and is omitted.

The body-side first control section 230a recognizes that a start switch such as a main switch is turned on at time t1.

The body-side first control section 230a instructs the lens-side control unit 330 to start blurring detection in the command data communication at time t2 and also instructs the body-side second control section 230b to start blurring detection. The blurring sensors 290 and 390 start the blurring detection according to the instruction, and the detection signal is output from time t3. The body-side second control section 230b and the lens-side control unit 330 judges the blurring state based on the detection signal, and set the judgement results to the lens-side blurring state and the body-side blurring state, respectively.

It is assumed that the body-side first control section 230a instructs the start of hotline communication in command data communication before time t4. The lens-side control unit 330 periodically outputs hotline data 90 since before time t4, and in FIG. 13, the time during which the hotline communication is performed includes time t4, time t4', and other times.

The body-side first control section 230a recognizes the lens-side blurring state from data 92a to 92d of the hotline data 90. Further, the body-side first control section 230a acquires at least the body-side blurring state from the body-side second control section 230b at approximately the same time. At time t4, both of the interchangeable lens 3 and the camera body 2 are determined to be in a stable composition state (indicated by black circles in FIG. 13).

The body-side first control section 230a instructs the lens-side control unit 330 to start moving-image antivibration in the command data communication at time t5 and also instructs the body-side second control section 230b to start the moving-image antivibration. The moving-image antivibration start instruction in the command data communication includes the body-side antivibration mode, the body-side blurring state, and the second correction rate.

Here, the hotline communication is started at time t5, and the body-side first control section 230a recognizes the lens-side antivibration mode from data 92q of hotline communication at time t4. The body-side first control section 230a transmits the body-side antivibration mode to the lens-side control unit 330 in the command data communication at time t5 in consideration of the lens-side antivibration mode and the body-side antivibration mode set by the operation member 280.

Further, the body-side first control section 230a recognizes that the lens-side blurring state for the angular blurring is a stable composition state (indicated by black circles in FIG. 13), based on data 92a of the hotline data 90 at time t4. Since the lens-side blurring state is the stable composition state and the body-side blurring state is the lens-side priority state, the body-side first control section 230a transmits, the fact that the total blurring state for the angular blurring is the stable composition state, to the lens-side control unit 330 in the command data communication at time t5. Here, at time t4, the body-side blurring state for the angular blurring based on the detection signal of the blurring sensor 290 is also a stable composition state. Accordingly, even at time t4, the blurring state in the camera body 2 and the blurring state in the interchangeable lens 3 can be matched with each other.

Further, the body-side first control section 230a determines the second correction rate $G\omega 2$ based on the setting at time t5 and FIG. 9, transmits a lens-side second correction rate $G\omega 2$ to the lens-side control unit 330 in the command data communication at time t5, and transmits a body-side second correction rate $G\omega 2$ to the body-side second control section 230b at the same time.

Upon receiving the moving-image antivibration start instruction at time t5, the lens-side control unit 330 or the body-side second control section 230b calculates a target position of the movable unit, and the lens drive unit 370b or the sensor drive unit 265 drives the movable unit from time t6 to start the blurring correction. In the example of FIG. 13, before time t5, the movable unit stops driving and is in a state of falling in a direction of gravity. Upon receiving the instruction at time t5, the movable unit is once driven to a movable center, and is subjected to the blurring correction after time t6.

In this way, since the body-side first control section 230a periodically acquires the hotline data 90, it is possible to recognize the change in the lens-side antivibration mode or the lens-side blurring state from the hotline data 90. When the body-side first control section 230a recognizes that the change in the lens-side antivibration mode or the lens-side blurring state from the hotline data 90, the command data communication is performed as necessary to match the blurring correction control in the camera body 2 with blurring correction control in the interchangeable lens 3.

Command data communication at time t5' will be described.

It is assumed that the user operates the interchangeable lens 3 to change the composition at time t7 in FIG. 13. Then, the first judgement unit 335 of the lens-side control unit 330 judges that the lens-side blurring state is a composition changing state. Then, in hotline communication (time t4') performed after time t7, the hotline data 90 is transmitted including the data 92a indicating that the lens-side blurring state is the composition changing state. On the other hand, from the detection result of the blurring sensor 290 of the camera body 2, the detection of the stable composition state continues.

In FIG. 13, since the lens-side priority state is selected as the body-side blurring state, the body-side first control section 230a transmits the fact that the total blurring state is a lens-side priority state in the command data communication at time t5' and also transmits the lens-side blurring state (composition changing state) to the body-side second control section 230b at the same time. When the lens-side control unit 330 receives the fact that the total blurring state is the lens-side priority state in the command data communication at time t5', the second judgement unit 336 judges that the total blurring state is a composition changing state and starts blurring correction of the composition changing state at time t5'. Further, since the body-side second control section 230b also receives that the total blurring state is the composition changing state, the blurring correction in the composition changing state is started at time t5'.

In this way, since the lens-side blurring state can be transmitted from the interchangeable lens 3 in the periodic hotline communication at times t4 and t4', the camera body 2 does not need to perform the command data communication including the instruction to transmit the lens-side blurring state from the interchangeable lens 3 to the camera body 2. Further, when the command data communication including the instruction to transmit the lens-side blurring state from the interchangeable lens 3 to the camera body 2 is performed, the command data communication is necessary to be periodically performed. When the cycle is longer than that of the hotline communication, there is a problem that the time when the lens-side blurring state and the body-side blurring state do not match becomes long.

Further, when the command data communication including the instruction to transmit the lens-side blurring state from the interchangeable lens 3 to the camera body 2 is performed at a high cycle, there is also a problem that another command data communication cannot be performed during that time. However, according to the present embodiment, since the blurring state is transmitted in the hotline communication independent of the command data communication, there is an effect that the above-described problems do not occur.

<Antivibration Operation During Still Image Photographing>

Figure 14:
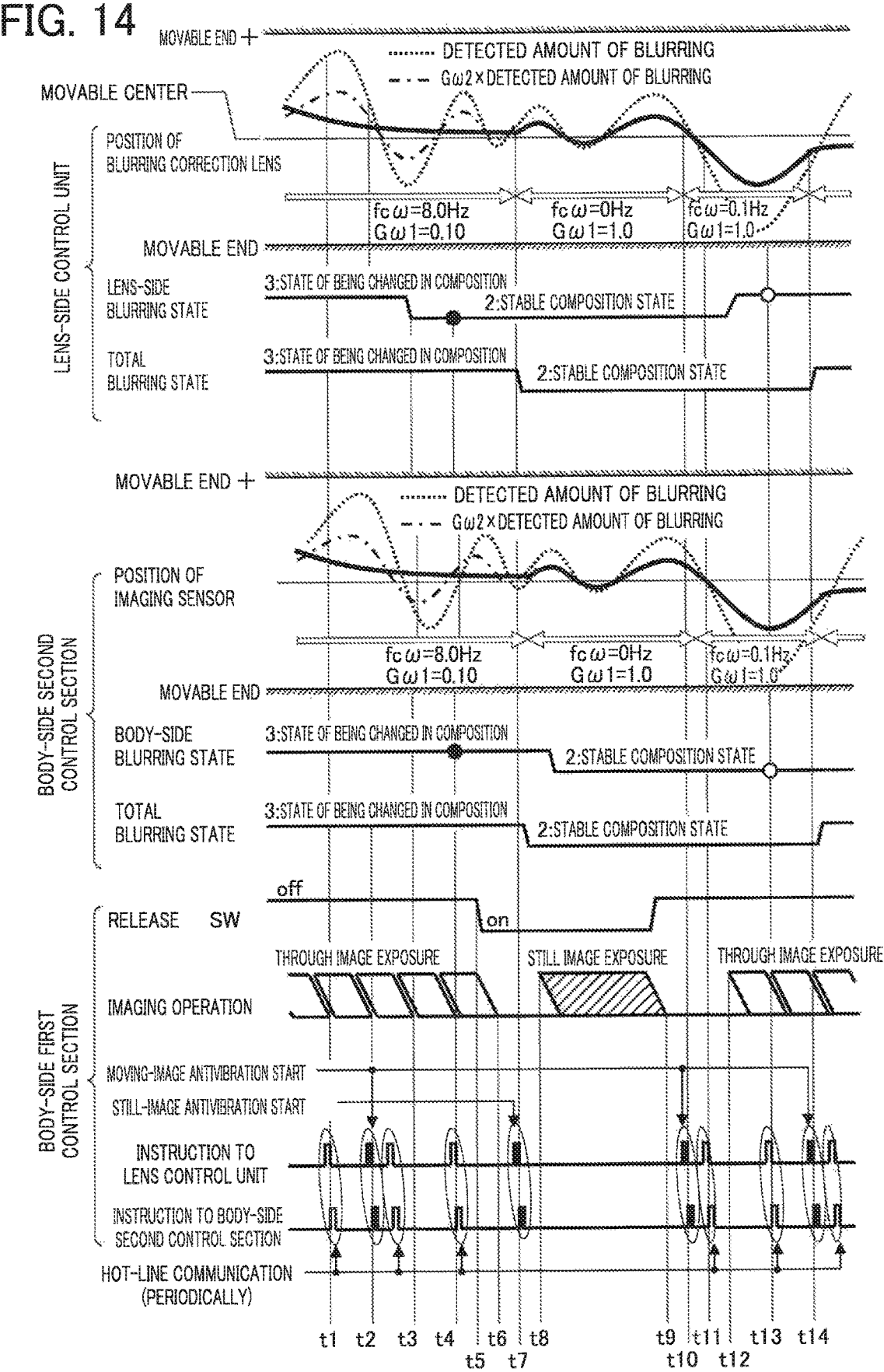
FIG. 14 is a timing chart showing a blurring correction state at the time of still image photographing.

FIG. 14 is a timing chart showing a state of the blurring correction state during the still image photographing and also shows through image exposure before and after a release operation of instructing the still image photographing. Originally, there is a timing chart for two axes of the X-axis and the Y-axis, but since the X-axis and the Y-axis are almost the same, only the operation for one axis will be described.

The above-described hotline communication is periodically performed after time t1. At time t2, the above-described moving-image antivibration start instruction is transmitted from the camera body 2 to the interchangeable lens 3 in the command data communication. In FIG. 14, the lens-side priority state is selected as the body-side blurring state.

At time t2, it is assumed that the user operates the interchangeable lens 3 to change the composition and the blurring state of the composition changing state is detected in both of the interchangeable lens 3 and the camera body 2. Therefore, in the moving-image antivibration after time t2, the composition changing state is selected as the total blurring state.

When the user stops the composition change operation of the interchangeable lens 3 at time t3, data 92a indicating the stable composition state as the lens-side blurring state is transmitted in the next hotline communication (time t4).

On the other hand, at the timing of time t4, the composition change state is continuously detected from the detection result of the blurring sensor 290, which does not match the detection result of the blurring sensor 390. Further, it is assumed that the operation of still image photographing is performed by the user at time t5.

The body-side first control section 230a recognizes that the release switch is turned on by the operation member 280 at time t5. The body-side first control section 230a operates the imaging sensor 260 at time t6 to stop the creation of the through image.

At time t7, the body-side first control section 230a instructs the lens-side control unit 330 to start the still-image antivibration in the command data communication and instructs the body-side second control section 230b to start the still-image antivibration. From time t7 to time t9, blurring correction control suitable for the still image photographing is performed.

Similarly to the moving-image antivibration start instruction, the still-image antivibration start instruction at time t7 includes the body-side antivibration mode, the body-side angular blurring state (lens-side priority state), and the second correction rate.

The body-side first control section 230a recognizes that the total blurring state is a stable composition state, from the fact that the lens-side blurring state is the stable composition state and the body-side blurring state is the lens-side priority state with the data 92a of the hotline communication (time t4) immediately before time t7.

Accordingly, at time t7, the still-image antivibration start instruction to the interchangeable lens 3 includes the lens-side priority state, and the still-image antivibration start instruction to the body-side second control section 230b includes the stable composition state as the total blurring state.

Further, the body-side first control section 230a determines the second correction rate Gω2 based on the setting at time t7 and FIG. 9, transmits a lens-side second correction rate Gω2 to the lens-side control unit 330 in the command data communication at time t7, and transmits a body-side second correction rate Gω2 to the body-side second control section 230b at the same time.

According to such instructions, the lens-side control unit 330 operates the lens drive unit 370b to drive the blurring correction lens 361b, and starts the blurring correction suitable for a still image. The same applies to the body-side second control section 230b.

The body-side first control section 230a starts still image exposure by the imaging sensor 260 at time t8, ends the still image exposure at time t9, and restarts through image exposure at time t12.

When the exposure is completed, the body-side first control section 230a instructs the lens-side control unit 330 to start moving-image antivibration in the command data communication and restarts moving-image antivibration (time t10). Further, similarly to the interchangeable lens 3, the body-side first control section 230a instructs the body-side second control section 230b to start moving-image antivibration.

When the exposure is completed, the lens-side control unit 330 restarts the hotline communication at time tn. The hotline communication may be continued from time t8 to time tn.

At time t13, the user performs a composition change operation to detect the composition changing state from the detection result of the blurring sensor 390 of the interchangeable lens 3. On the other hand, the stable composition state is detected from the detection result of the blurring sensor 290 of the camera body 2. In FIG. 14, since the lens-side priority state is set as the body-side blurring state, the body-side first control section 230a transmits the lens-side priority state to the interchangeable lens 3 in the command data communication at time t14, and transmits the lens-side blurring state (composition changing state) received in the hotline communication to the body-side second control section 230b, as a total blurring state. From time t14, the lens-side control unit 330 and the body-side second control section 230b perform blurring correction control in which the total blurring state is set to the composition changing state.

As described above, even when the lens-side blurring state and the body-side blurring state do not match, the lens-side blurring state can be transmitted to the camera body 2 in the hotline communication, and thus the time when the blurring state of the camera body 2 does not match the blurring state of the interchangeable lens 3 can be shortened.

According to the above-described embodiment, the following operational effects can be obtained.

Since the sharing ratio between the blurring correction in the interchangeable lens 3 and the blurring correction in the camera body 2 is transmitted and received, it is possible to improve the blurring correction effect by cooperating the blurring correction in the interchangeable lens 3 and the blurring correction in the camera body 2 with each other in the camera system 1. Further, since the sharing ratio between the interchangeable lens 3 and the camera body 2 can be set, it is possible to prevent the blurring correction in the interchangeable lens 3 or the camera body 2 from being excessively performed and being suppressed too much. Since the correction rate can be set by the body-side control unit 230, it is possible to perform the blurring correction according to photographing conditions such as still image photographing or moving image photographing and the shutter speed. Further, the sharing ratio can be set for each of the angular blurring and the translational blurring, and even when the interchangeable lens 3 has the angular blurring correction function but does not have the translational blurring correction function, the camera body 2 and the interchangeable lens 3 can cooperate with each other. Further, since the sharing ratio is transmitted in the command data communication, the timing of the transmission from the camera body 2 can be determined, and the hotline communication can be performed in parallel. Since the body-side first control section 230a transmits the body-side sharing ratio to the body-side second control section 230b and transmits the lens-side sharing ratio to the lens-side control unit 330, the body-side second control section 230b and the lens-side control unit 330 can be easily controlled based on each of the sharing ratios.

Since the camera body 2 transmits the body-side information based on the information used for calculating the target position of the movable unit from the detection signal of the blurring sensor 309 to the interchangeable lens 3, the information used for calculating the target position can be matched with each other in the camera body 2 and the interchangeable lens 3. The information used for calculating the target position includes information such as the cutoff frequency on the threshold value of the frequency band for correcting the blurring and information such as the first correction rate on the strength of the effect of the blurring correction.

Here, when the information used for calculating the target position are matched with each other in the camera body 2 and the interchangeable lens 3, for example, by matching the detection results of the blurring state to change a frequency band to be subjected to blurring correction and a movable range of the blurring correction movable unit, the blurring correction effect can be further enhanced. Furthermore, since the blurring state is transmitted from the interchangeable lens 3 to the camera body 2 in the hotline communication, a time during which the blurring states of the interchangeable lens 3 and the camera body 2 do not match each other can be reduced. If the blurring state is transmitted from the interchangeable lens 3 to the camera body 2 only in the command data communication without being transmitted in the hotline communication, recognition of the detection result of the lens-side blurring state by the camera body 2 would be delayed in time. As a result, a time during which the detection results of the interchangeable lens 3 and the camera body 2 deviate from each other would be large. This causes the user to feel a reduction in comfort of use (discomfort) of a finder image and a through image at the time of blurring correction. However, the present embodiment is able to reduce a time during which the detection results of the interchangeable lens 3 and the camera body 2 deviate from each other.

The lens-side second communication section 340b can also periodically transmit the hotline data 90 at a cycle shorter than that of receiving an instruction from the camera body 2 in the command data communication. This allows information used for the blurring correction control to be immediately transmitted, regardless of timing and time period of the command data communication.

The blurring sensor 390 can also periodically output the detection signal at a cycle shorter than that in the hotline communication. This can enhance the immediacy of the hotline data 90 because it is not necessary to consider a deviation between the timing of outputting the hotline data 90 and the timing of outputting the detection signal of the blurring sensor 390.

The interchangeable lens 3 can also transmit the reliability of numerical values (effectiveness of positional information, effectiveness of lens-side blurring state) included in the hotline data 90. Thus, the interchangeable lens 3 can transmit the numerical values and their corresponding reliability to the camera body 2 in one hotline communication so that the camera body 2 can take actions depending on the reliability.

The interchangeable lens 3 periodically transmits the hotline data 90 having a fixed length to the camera body 2 so that, unlike the case of transmitting variable-length data, transmission can be repeated at a fixed period.

The present invention is not limited to the contents described above. Other embodiments contemplated within the scope of the technical idea of the present invention are also included within the scope of the present invention.

(Modification 1)

In the above description, an example of using the DMA function in the hotline communication has been described. Instead of using the DMA function, software may be interposed to generate the hotline data 90. In Modification 1, transmission of the HDATA signal is performed by the lens-side second communication section 340b, and generation of the hotline data 90 is performed by the lens-side control unit 330. With this configuration, the hotline communication and the generation of the hotline data 90 can be performed in parallel without using the DMA function. However, the generation of the hotline data 90 is performed within a time period that does not exceed one cycle of the hotline communication.

(Modification 2)

In the above description, an example in which the body-side control unit 230 is divided into the body-side first control section 230a and the body-side second control section 230b has been described. However, the body-side control unit 230 may be configured as one functional unit, without dividing the body-side first control section 230a and the body-side second control section 230b. In this case, the body-side control unit 230 may directly control the sensor drive unit 265, and a communication line by the body-side second communication section 240b may be connected to only the one single body-side control unit 230.

Further, in the example of the hotline communication of FIG. 4, a data transfer direction of a clock synchronous communication using only two signal lines, that is, the HCLK signal line and the HDATA signal line, is one direction from the interchangeable lens 3 to the camera body 2. However, one more signal line may be added to enable bidirectional data transfer. Alternatively, data communication may be performed bidirectionally by configuring input and output of the HDATA signal line to be switchable.

The hotline communication is not limited to clock synchronous communication. UART (Universal Asynchronous Receiver/Transmitter communication) may be used. Further, in addition to the clock signal line and the data signal line, a handshake signal line or a CS (chip select) signal line is added to synchronize the communication start timings between the lens-side control unit 330, and the body-side first control section 230*a* and the body-side second control section 230*b*.

(Modification 3)

In the camera body 2, the sensor drive unit 265 that drives the imaging sensor 260 in a direction intersecting the optical axis O may be omitted, and blurring correction for moving the position of the image may be performed by image processing performed by the signal processing unit 270. Alternatively, in the camera body 2, a blurring correction by the sensor drive unit 265 and a blurring correction by the signal processing unit 270 may be performed together.

(Modification 4)

The interchangeable lens 3 and the camera body 2 may share a blurring correction depending on blurring components. For example, the interchangeable lens 3 shares angular blurring for the X-axis and the Y-axis and translational blurring for the X-axis and the Y-axis, and the camera body 2 shares blurring (roll component) about the optical axis O.

(Modification 5)

The lens-side blurring state and the lens-side antivibration mode are transmitted to the camera body 2 in the hotline communication, but may be transmitted in the command data communication. In such a case, the format of transmission in the hotline data communication may be different from the format of transmission in the command data communication.

EXPLANATION OF REFERENCE NUMERALS

1: camera system
2: camera body
3: interchangeable lens
230: body-side control unit
230*a*: body-side first control section
230*b*: body-side second control section
235: storage section
240: body-side communication unit
240*a*: body-side first communication section
240*b*: body-side second communication section
250: power supply unit
260: imaging sensor
260S: imaging surface
265: sensor drive unit
270: signal processing unit
280: operation member
285: display unit
290: sensor
290*a*: angular velocity sensor
290*b*: acceleration sensor
309: sensor
330: lens-side control unit
331: filter unit
332: first change unit
333: second change unit
334: integration unit
335: first judgement unit
336: second judgement unit
337: third judgement unit
340: lens-side communication unit
340*a*: lens-side first communication section
340*b*: lens-side second communication section
350: lens-side storage unit
360: imaging optical system
361*a*: focusing lens
361*b*: correction lens
370: lens drive unit
370*a*: lens drive unit
370*b*: lens drive unit
375: instruction unit
390: sensor
390*a*: angular velocity sensor
390*b*: acceleration sensor
401: clock signal
402: command packet
404: first control process
405: signal
406: data packet
407: data packet
408: second control process
502: signal
503: signal

The invention claimed is:

1. A camera body to which a camera accessory provided with an optical system configured to form an object image is detachably mounted, the camera body comprising:
   a microcomputer that determines, when correcting blurring with the camera accessory and the camera body, a sharing ratio which is a ratio of a blurring correction of the camera accessory and a ratio of a blurring correction of the camera body;
   a CLK signal line terminal with which a clock signal is transmitted to the camera accessory;
   a DATAB signal line terminal with which data is outputted to the camera accessory in synchronization with the clock signal;
   a DATAL signal line terminal with which data is inputted from the camera accessory in synchronization with the clock signal; and
   a HDATA signal line terminal with which data is inputted from the camera accessory,
   wherein the CLK signal line terminal, the DATAB signal line terminal, and the DATAL signal line terminal are used for first communication that performs two-way data transmission and reception with the camera accessory,
   the HDATA signal line terminal is not used for the first communication, and is used for second communication that performs one-way data transmission from the camera accessory to the camera body, and
   data showing the ratio of blurring correction of the camera accessory and/or data showing the ratio of the blurring correction of the camera body among the sharing ratio are/is transmitted by the first communication.

2. The camera body according to claim 1, wherein the second communication is Universal Asynchronous Receiver/Transmitter communication (UART).

3. The camera body according to claim 1, further comprising a HCLK signal line terminal with which a clock signal is generated by the camera accessory,
   wherein the second communication is clock synchronous communication that receives data inputted at the HDATA signal line terminal in synchronization with the clock signal inputted at the HCLK signal line terminal.

4. The camera body according to claim 1, wherein data showing a position of a focusing lens that is included in the optical system and moves in an optical axis direction is received in the second communication.

5. The camera body according to claim 1, wherein data in relation to a blurring correction lens that is included in the optical system and moves in a direction intersecting an optical axis is received in the second communication.

6. The camera body according to claim 1, wherein information in relation to the sharing ratio transmitted by the first communication is the data showing the ratio of the blurring correction of the camera accessory.

7. The camera body according to claim 1, further comprising:
an imaging unit that images the object image, and
a drive unit configured to drive the imaging unit in a direction intersecting an optical axis of the camera accessory depending on the sharing ratio.

8. The camera body according to claim 1, further comprising an imaging unit that images the object image,
wherein the sharing ratio differs depending on whether the imaging unit performs moving image photographing or still image photographing.

9. The camera body according to claim 1, wherein the sharing ratio indicates at least one of a first sharing rate for correcting angular blurring and a second sharing rate for correcting translational blurring of the blurring.

10. The camera body according to claim 1, further comprising:
a detection unit that detects the blurring of the camera body and outputs a detection signal; and
a blurring correction control unit that performs control for correcting the blurring based on the detection signal and the sharing ratio.

11. A camera accessory detachably mounted to a camera body, the camera accessory comprising:
a correction optical system configured to move in a direction intersecting an optical axis of the camera accessory;
a communication unit that receives, when correcting blurring with the camera accessory and the camera body, information in relation to a sharing ratio which is a ratio of a blurring correction of the camera accessory and a ratio of a blurring correction of the camera body from the camera body; and
a control unit that controls the correction optical system based on the sharing ratio,
wherein the communication unit includes
a CLK signal line terminal with which a clock signal is transmitted from the camera body;
a DATAB signal line terminal with which data is inputted from the camera body in synchronization with the clock signal;
a DATAL signal line terminal with which data is outputted to the camera body in synchronization with the clock signal; and
a HDATA signal line terminal with which data is outputted to the camera body,
wherein the CLK signal line terminal, the DATAB signal line terminal, and the DATAL signal line terminal are used for first communication that performs two-way data transmission and reception with the camera body,
the HDATA signal line terminal is not used for the first communication, and is used for second communication that performs one-way data transmission to the camera body, and
data showing the sharing ratio is received by the first communication.

12. The camera accessory according to claim 11, further comprising: a detection unit that detects the blurring of the camera accessory and outputs a detection signal;
wherein the control unit controls the correction optical system based on the detection signal and the sharing ratio.

13. A method of transmitting information between a camera accessory detachably mounted to a camera body and the camera body, the method comprising:
performing first communication which is a clock synchronous two-way data transmission and reception that communicates data in synchronization with a clock signal between the camera body and the camera accessory;
performing second communication that is separated from the first communication and performs one-way data transmission from the camera accessory to the camera body;
transmitting, when correcting blurring with the camera body and the camera accessory mounted to the camera body, information in relation to a sharing ratio of blurring correction of the camera body to blurring correction of the camera accessory from the camera body to the camera accessory via the first communication, and
transmitting information in relation to a state of a blurring correction optical system that is included in the camera accessory and moves according to the blurring from the camera accessory to the camera body via the second communication.

14. A non-transitory computer-readable medium storing a program for causing a computer to execute the method according to claim 13.

* * * * *